(12) United States Patent
Masuda

(10) Patent No.: US 8,031,257 B2
(45) Date of Patent: Oct. 4, 2011

(54) ZOOM LENS CONTROL APPARATUS AND OPTICAL INSTRUMENT

(75) Inventor: Shinichi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1344 days.

(21) Appl. No.: 11/372,999

(22) Filed: Mar. 9, 2006

(65) Prior Publication Data

US 2006/0203119 A1 Sep. 14, 2006

(30) Foreign Application Priority Data

Mar. 11, 2005 (JP) .................................. 2005-068711

(51) Int. Cl.
*H04N 5/232* (2006.01)
*H04N 5/262* (2006.01)

(52) U.S. Cl. .................................. 348/345; 348/240.99

(58) Field of Classification Search .................. 348/347, 348/345, 340, 240.99
See application file for complete search history.

(56) References Cited

U.S. PATENT DOCUMENTS

| 4,976,523 A |   | 12/1990 | Ishikawa |         |
|-------------|---|---------|----------|---------|
| 5,027,147 A | * | 6/1991  | Kaneda   | 396/81  |
| 5,231,441 A | * | 7/1993  | Hata     | 396/82  |
| 2002/0008919 A1 | * | 1/2002 | Yamanashi | 359/683 |

FOREIGN PATENT DOCUMENTS

| JP | 01-106006 A | 4/1989  |
|----|-------------|---------|
| JP | 1-158882    | 6/1989  |
| JP | 02-230109 A | 9/1990  |
| JP | 03-050513 A | 3/1991  |
| JP | 2002-350714 | 12/2002 |
| JP | 2004-138884 A | 5/2004 |

* cited by examiner

*Primary Examiner* — Hung Lam
(74) *Attorney, Agent, or Firm* — Canon U.S.A., Inc., IP Division

(57) ABSTRACT

A zoom lens control apparatus, which moves a first lens group and a second lens group positioned behind the first lens group on the optical axis of the first lens group with respect to a photographic subject in the optical axis direction when performing a zoom operation, converts a photographic subject optical image entering through the first and the second lens groups into image data at preset time intervals, calculates a focus evaluation value indicating the state of focus based on the acquired image data, and moves the first and the second lens groups so that the calculated focus evaluation value approaches its maximum. The second lens group is moved in a preset optical axis direction from the beginning to the end of focusing control, and the first lens group is moved in the preset optical axis direction at the end of focusing control.

6 Claims, 26 Drawing Sheets

ZOOM LENS CONTROL APPARATUS AND OPTICAL INSTRUMENT

FIELD OF THE INVENTION

The present invention relates to a zoom lens control apparatus and an optical instrument such as a camera that is equipped with the zoom lens control apparatus.

BACKGROUND OF THE INVENTION

Conventionally, focusing control has been performed by detecting a defocus amount between the position along the optical axis of the focal plane on which the image of a photographic subject is focused and the position along the optical axis of the film surface, converting this defocus amount into an amount by which a focus lens should be moved (a focus lens moving amount), and driving a dedicated focus lens by just that moving amount.

In addition, in an image sensing apparatus equipped with an electrical image sensor, an arrangement has been proposed in which focusing control is performed by detecting the predetermined spatial frequency component of the sensed image and driving the focus lens so that that value peaks.

At present, in order to make cameras more compact, there is a growing need to make the lens more compact as well. In order to make the lens more compact, it is necessary to move and to stop the focus lens with a high degree of accuracy.

Conventionally, controlling a gross focusing control lens and a fine focusing control lens so as to perform high-accuracy focusing control has been proposed (see Japanese Patent Laid-Open No. 1-158882).

In addition, controlling the gross focusing control lens and the image sensors for the fine focusing control (capable of moving along the optical axis) to perform high-accuracy focusing control also has been proposed (Japanese Patent Laid-Open No. 2002-350714).

Where an effort is made to improve the accuracy of focusing control in the typical conventional auto focus camera lens control apparatus described above, one possible method of doing so, for example, involves enhancing the detection and analysis capabilities of an encoder that monitors the amount of movement of the focus lens so as to improve focus lens positioning accuracy. In such an instance, in an effort to improve the detection and analysis capabilities of the encoder, the detection capability of the encoder is itself enhanced, or detection is undertaken after expansion and conversion of the focus lens linear movement amount. However, this sort of method requires micro machining technology, mechanical vibrations can no longer be ignored, and so forth, giving rise to self-imposed limits on improvements in accuracy.

In order to further facilitate an understanding of the problems of the conventional art, a description will now be given of the conventional zoom lens barrel focusing control using FIGS. 25 and 26.

First, a description is given of FIG. 25, at the top of which is shown schematically the arrangement of lens groups in the zoom lens barrel and an image sensor in a wide-angle end state, beneath which is shown the arrangement of the lens groups in the zoom lens barrel and the image sensor in a telephoto-end state. Three graphs are shown at the bottom of the drawing, in which the vertical axis for all three graphs is elapsed time T. The graph on the left shows the lens position on the horizontal axis, showing the track of the movement of a second lens group 1004 and of a third lens group 1006 positioned closer to an image sensor 1008 during focusing control. The graph in the center shows focus evaluation values calculated by a signal processing circuit based on the image signals obtained by the image sensor 1008 on the horizontal axis, whose maximal value indicates an in-focus state. The graph on the right shows focusing sensitivity on the horizontal axis. Focusing sensitivity is a ratio of the amount of movement of the focal plane in the direction of the optical axis to the amount of movement of the moving lens group. For example, a focusing sensitivity of −8.5 in which only the third lens group 1006 moves indicates that, when the third lens group 1006 moves 1 µm, the focal plane moves 8.5 µm in the opposite direction.

It is assumed that the lens groups are positioned at the telephoto end and focused on infinity, with the photographic subject to be sensed positioned 2 m away from the camera.

As shown in the left graph in FIG. 25, from a time T0, the third lens group 1006, which is a concave lens system, begins to move linearly toward the image sensor 1008. The focusing sensitivity at this time is −8.5. When a third lens group stepping motor, not shown, moves one step, the third lens group 1006 is driven 12.5 µm toward the image sensor 1008, and, as shown in FIG. 26, the position of the focal plane changes from P0 to P1 and the focus evaluation value increases from V0 to V1. When the third lens group 1006 is driven one step further toward the image sensor 1008, the position of the focal plane changes from P1 to P2. When the third lens group 1006 is driven one step further still toward the image sensor 1008, the position of the focal plane changes from P2 to P3. In FIG. 25, the focus evaluation value reaches its maximal value (maximum focus evaluation value) VP at a time T1, after which it begins to decline. The maximum focus evaluation value VP is stored.

Using a time T2 as the starting point for the lens position, the third lens group stepping motor is rotated in reverse, driving the third lens group 1006 in reverse. At a time T3, the position of the focal plane returns to position P2 (=P4) and the focus evaluation value returns to V2.

If 90 percent of the maximum focus evaluation value VP is considered a pass level value VS, and if the focus evaluation value V is at or above VS, then it is possible to sense a fully focused photograph. In FIG. 26, PF is the position of the focal plane where the maximum focus evaluation value VP is obtained, and δt is the range of positions of the focal plane at which, at the telephoto end, the focus evaluation value is at or above the pass level value VS.

In the conventional example described in FIGS. 25 and 26, in order to raise the focus evaluation value V to or above the pass level value VS, the focal plane must move between focal plane positions P2 and P3. However, the third lens group stepping motor enables the focal plane to move to positions P2 and P3 but cannot stop between the two positions, and therefore, at the telephoto end, the position of the focal plane cannot be made to be within the range δt, making it impossible to sense a fully focused photograph.

In addition, in the focusing control apparatus described in Japanese Patent Laid-Open No. 1-158882, it is necessary to provide stepping motors or other drive means for both the gross focusing control lens and the fine focusing control lens, leading to an increase in the size of the apparatus and moreover posing high technological hurdles in terms of switching between gross and fine control.

In addition, in the camera system described in Japanese Patent Laid-Open No. 2002-350714, in order to obtain high-accuracy focusing, an image sensor drive apparatus inside the camera body is required separate from and in addition to the lens drive apparatus unit inside the lens barrel, which leads to an increase in the overall size of the camera.

SUMMARY OF THE INVENTION

The present invention has been made in consideration of the above situation, and has as its object to provide a zoom lens control apparatus and optical instrument capable of gross and fine adjustments using a simple structure.

According to the present invention, the foregoing object is attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens so that a focal plane moves at a first speed, and carries out focusing control by moving the first lens and the second lens so that the focal plane moves at a second speed which is slower than the first speed.

According to the present invention, the foregoing object is also attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens and the second lens in accordance with the focus evaluation value calculated by the calculation unit, wherein the focusing controller moves the second lens in a preset optical axis direction at the beginning of focusing control, and decreases the speed of movement of the second lens as well as moves the first lens in a preset optical axis direction at the end of focusing control.

According to the present invention, the foregoing object is also attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens and the second lens in accordance with the focus evaluation value calculated by the calculation unit, wherein the focusing controller moves the first lens and the second lens in a preset optical axis direction at the beginning of focusing control, and moves the first lens and the second lens in the opposite optical axis direction at the end of focusing control.

According to the present invention, the foregoing object is also attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens and the second lens in accordance with the focus evaluation value calculated by the calculation unit, wherein the focusing controller moves the second lens in a preset optical axis direction at the beginning of focusing control, and moves the second lens in the opposite optical axis direction as well as moves the first lens in the same optical axis direction as the direction of movement of the second lens at the end of focusing control.

According to the present invention, the foregoing object is also attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens and the second lens in accordance with the focus evaluation value calculated by the calculation unit, wherein the focusing controller moves the second lens in a preset optical axis direction at the beginning of focusing control, and stops the second lens as well as moves the first lens in a preset optical axis direction at the end of focusing control.

According to the present invention, the foregoing object is also attained by providing a zoom lens control apparatus that, when zooming, moves a first lens and a second lens positioned behind the first lens on the optical axis of the first lens with respect to a photographic subject in an optical axis direction, the apparatus comprising: an image sensing unit that converts an optical image of the photographic subject entering through the first lens and the second lens into image data; a calculation unit that calculates a focus evaluation value that indicates a state of focus based on image data from the image sensing unit; and a focusing controller that carries out focusing control by moving the first lens and the second lens in accordance with the focus evaluation value calculated by the calculation unit, wherein the focusing controller moves the first lens and the second lens in a preset optical axis direction at the beginning of focusing control, and stops the first lens and the second lens as well as moves a third lens positioned closer to the photographic subject on the optical axis than the second lens at the end of focusing control.

According to the present invention, the foregoing object is also attained by providing an optical instrument comprising: a first lens that moves in an optical axis direction when zooming; a second lens positioned behind the first lens on the optical axis of the first lens with respect to a photographic subject and which moves in the optical axis direction when zooming; and any one of the preceding zoom lens control apparatuses.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiment of the present invention will now be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
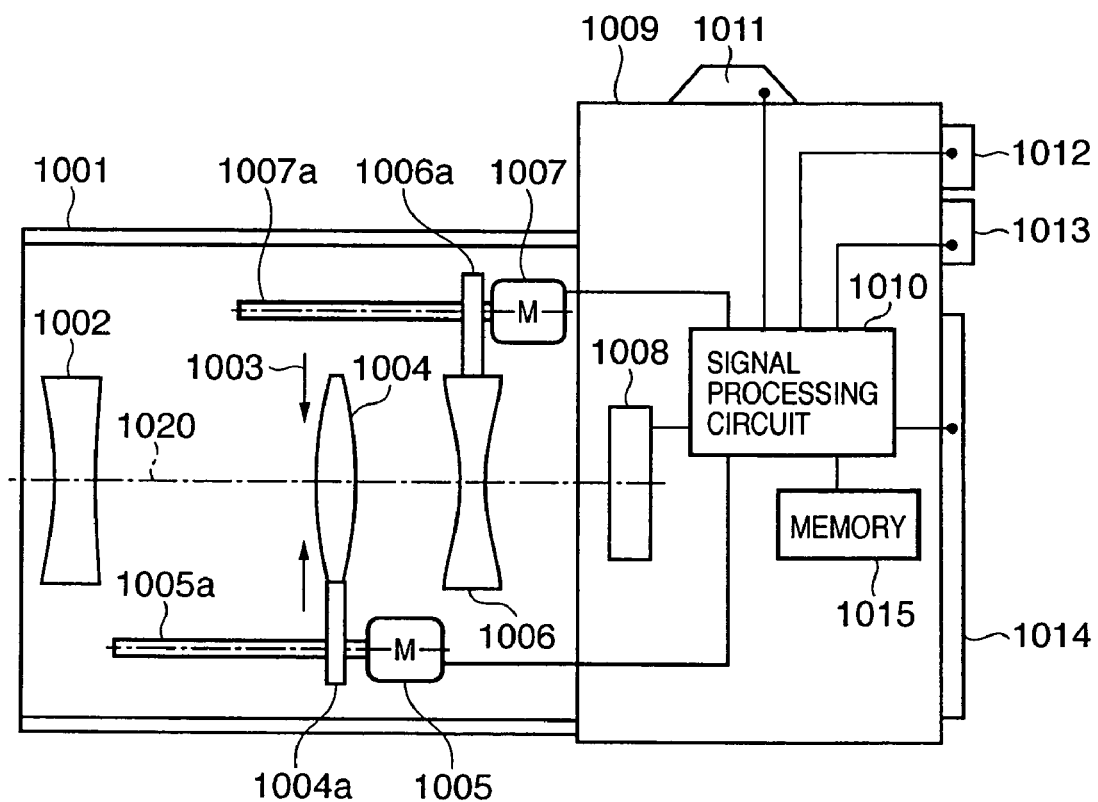
FIG. 1 is a diagram showing the schematic configuration of a camera including a zoom lens barrel in a wide-angle end state according to a first embodiment of the present invention.

FIG. 1 is a diagram showing the general structure of a camera including a zoom lens barrel according to a first embodiment of the present invention. A zoom lens barrel 1001 in FIG. 1 is affixed to the front of a camera body 1009 in a wide-angle state.

Multiple image sensing lenses are arranged inside the zoom lens barrel 1001, in a so-called inner focus type zoom lens. In order, starting from the photographic subject side, are arranged a first lens group 1002, a shutter 1003, a second lens group 1004, a third lens group 1006, and an image sensor (CCD) 1008.

The first lens group 1002 is a concave lens, and is affixed to the zoom lens barrel 1001. Although drawn as a single lens in FIG. 1, the first lens group 1002 may be composed of a plurality of lenses.

The second lens group 1004 is supported by an ordinary support method (for example, by guide bar or cam barrel) so as to be capable of moving reciprocally in the direction of the optical axis inside the zoom lens barrel 1001.

The tip of the rotary shaft of a stepping motor 1005 for the second lens group 1004 forms a lead screw 1005a, which engages with a nut 1004a on the second lens group 1004. When the stepping motor 1005 rotates forward/in reverse, the second lens group 1004 moves reciprocally in the direction of the optical axis. Control of that rotation is performed by a signal processing circuit 1010 inside the camera body 1009. The lead of the lead screw 1005a is 0.65 mm/lead. Forty control pulses cause the stepping motor 1005 to make one rotation. That is, when the stepping motor 1005 rotates one step, the second lens group 1004 moves 16.25 µm.

The shutter 1003 controls the amount of light that reaches the image sensor 1003 by time and opening diameter. The shutter 1003 is fixed in place in front of the second lens group 1004 and moves integrally with the second lens group 1004.

The third lens group 1006 is supported by an ordinary support method (for example, by guide bar or cam barrel) so as to be capable of moving reciprocally in the direction of the optical axis behind the second lens group 1004 inside the zoom lens barrel 1001.

The tip of the rotary shaft of a stepping motor 1007 for the third lens group 1006 forms a lead screw 1007*a*, which engages a nut 1006*a* on the third lens group 1006. When the stepping motor 1007 rotates forward/in reverse, the third lens group 1006 moves reciprocally in the direction of the optical axis. Control of that rotation is performed by the signal processing circuit 1010 inside the camera body 1009. The lead of the lead screw 1007*a* is 0.50 mm/lead. Forty control pulses cause the stepping motor 1007 to make one rotation. That is, when the stepping motor 1007 rotates one step, the third lens group 1006 moves 12.5 μm.

As described above, the ratio of the amount of movement of the second lens group 1004 to the amount of movement of the third lens group 1006 when one pulse is applied to the stepping motors 1005, 1007 is 0.65/0.50=1.3.

The image sensor (CCD) 1008 converts an image formed by the image sensing lens into electronic data. The AF (Auto Focus) of the present embodiment is the so-called contrast-type, in which an image signal (luminance signal) generated by the image sensor 1008 is processed by the signal processing circuit 1010, and the state of focus judged and focusing control performed.

Within the camera body 1009 is disposed the signal processing circuit 1010 that controls the camera as a whole, including the zoom lens barrel 1001.

A release button 1011 is provided on the top of the camera body 1009, which, when pressed lightly in a first stage switch, performs contrast-type focusing control on the basis of the image signal obtained from the image sensor 1008 while the lens groups relating to focusing control are driven by motors. When the release button 1011 continues to be held down and pressed deeply in a second stage switch, the shutter 1003 is opened and closed, the image is converted into electrical signals by the image sensor 1008 and recorded in a memory 1015.

A telephoto direction zoom button 1012 that zooms the lens toward the telephoto side while depressed and a wide-angle direction zoom button 1013 that zooms the lens toward the wide-angle side are provided on the top part of the back of the camera body 1009.

A liquid crystal display device 1014 that displays images prior to and after image sensing is provided on the bottom part of the back of the camera body 1009.

[Zoom Operation]

A description will now be given of the operation of zooming from the wide-angle end to the telephoto end, with reference to FIGS. 1, 2, 3 and 7.

Initially, the zoom lens barrel 1001 is the wide-angle end state (FIG. 1).

Figure 3:
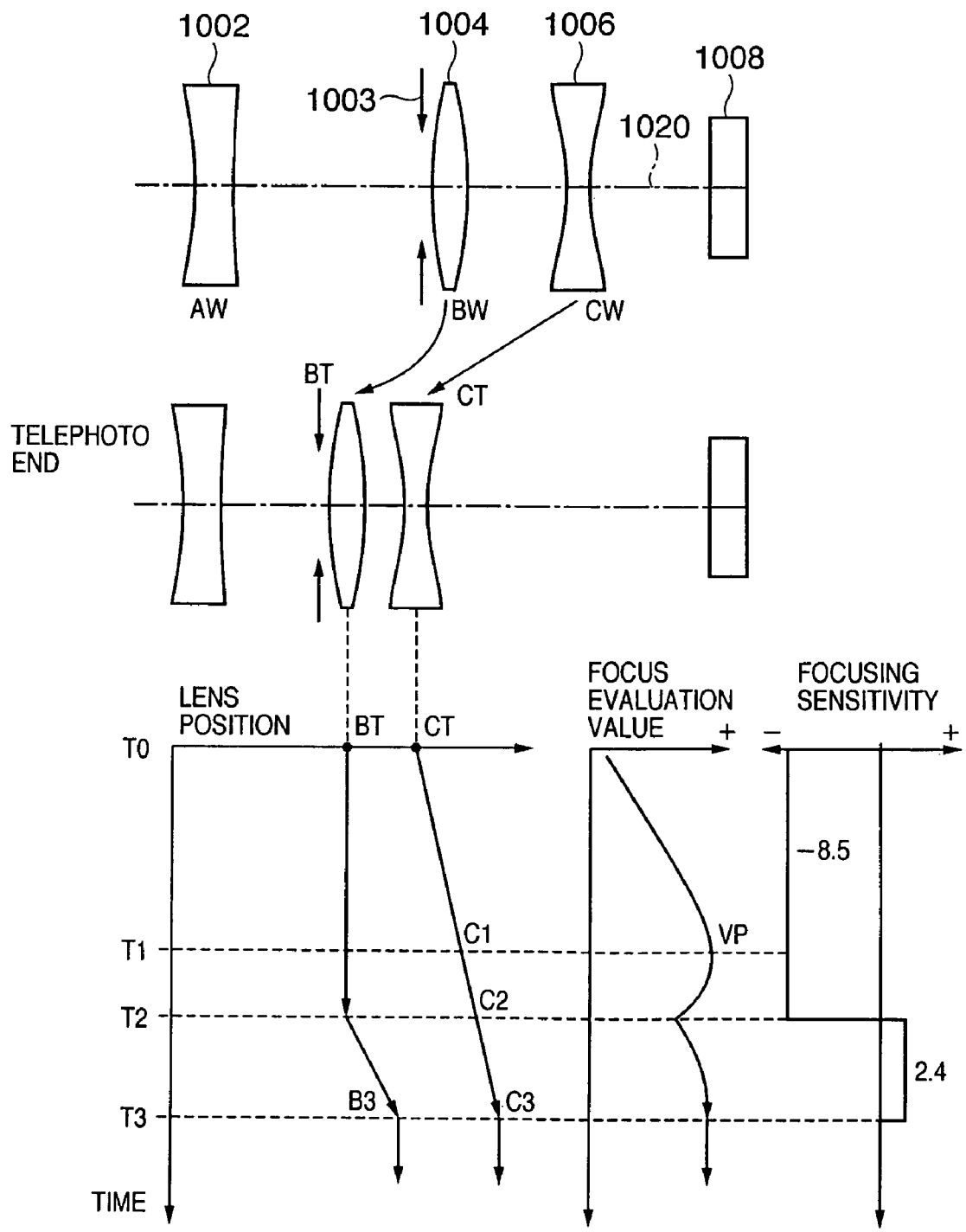
FIG. 3 is a schematic diagram showing the relative positions of zoom lens groups at the telephoto end and the wide-angle end and focusing control at the telephoto end according to the first embodiment of the present invention.
Figure 7:
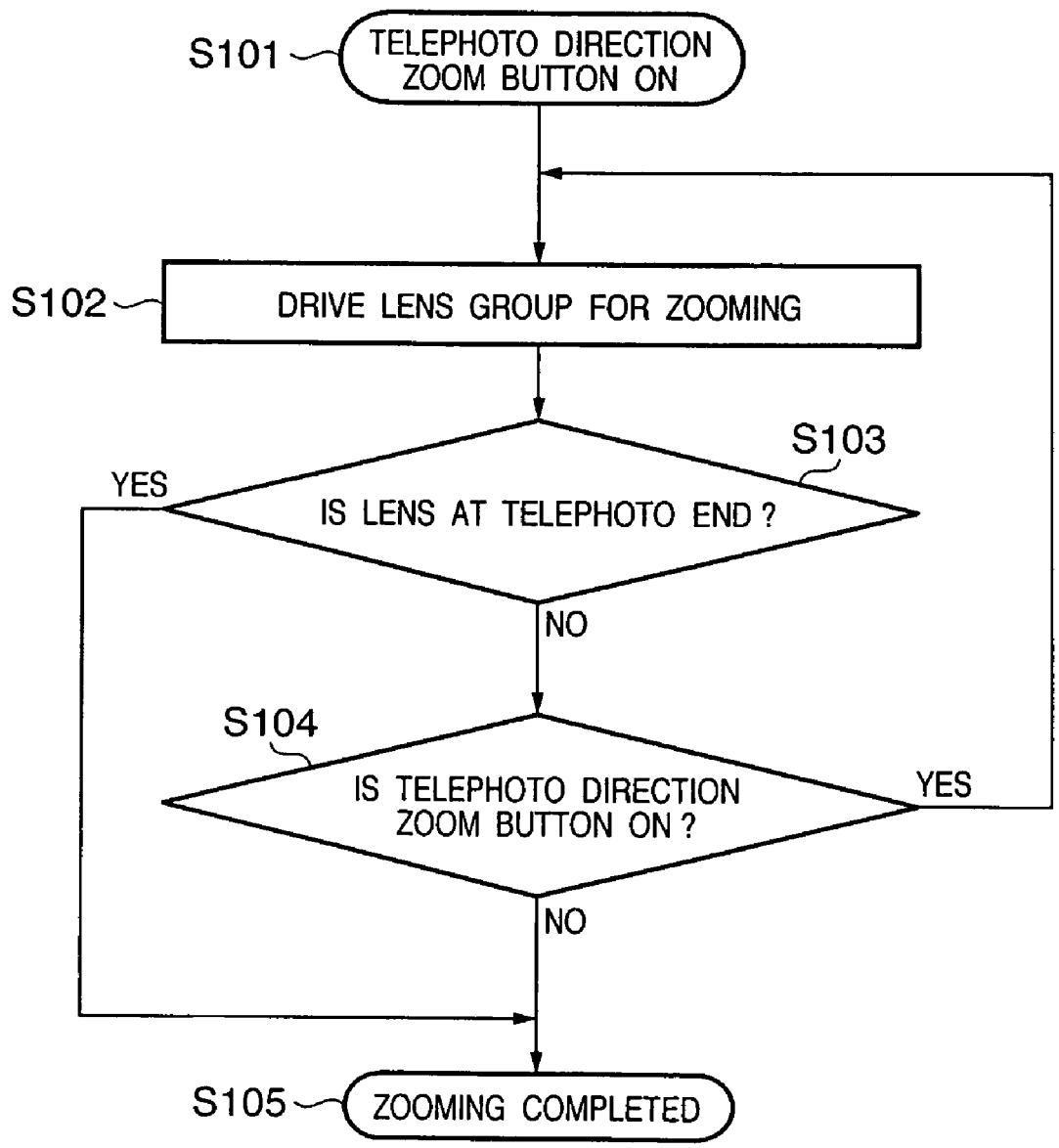
FIG. 7 is a flow chart illustrating a zoom operation according to the first embodiment of the present invention.

In the flow chart shown in FIG. 7, when the telephoto direction zoom button 1012 is pressed in step S101, the lens groups used for zooming are driven in step S102. In this case, the second lens group stepping motor 1005 and the third lens group stepping motor 1007 are rotated in a predetermined number-of-pulses relation. Accordingly, as shown in FIG. 3, the second lens group 1004 begins to move along a curved track and the third lens group 1006 begins to move along a straight track so as to zoom optically.

In step S103, it is determined whether or not the lens groups 1004, 1006 have fully reached the telephoto end. If the lens groups 1004, 1006 have reached the telephoto end, then the zoom operation is terminated. If the lens groups 1004, 1006 have not reached the telephoto end, then processing proceeds to step S104.

In step S104, it is determined whether or not the telephoto direction zoom button 1012 is still being pressed. If the telephoto direction zoom button 1012 is still being pressed, then processing returns to step S102 and driving of the lens groups used for zooming is continued. If the telephoto direction zoom button 1012 is no longer being pressed, then the zoom operation is terminated.

In the present example, the telephoto direction zoom button 1012 continues to be pressed, and ultimately, in step S103, the lens groups 1004, 1006 are determined to have reached the telephoto end, at which time the zoom operation is ended in step S105.

As a result, in FIG. 3, the second lens group 1004 is driven from the wide-angle end position BW to the telephoto end position BT. The third lens group 1006 is driven from the wide-angle end position CW to the telephoto end position CT. In this case, the third lens group 1006 moves more than the second lens group 1004.

Figure 2:
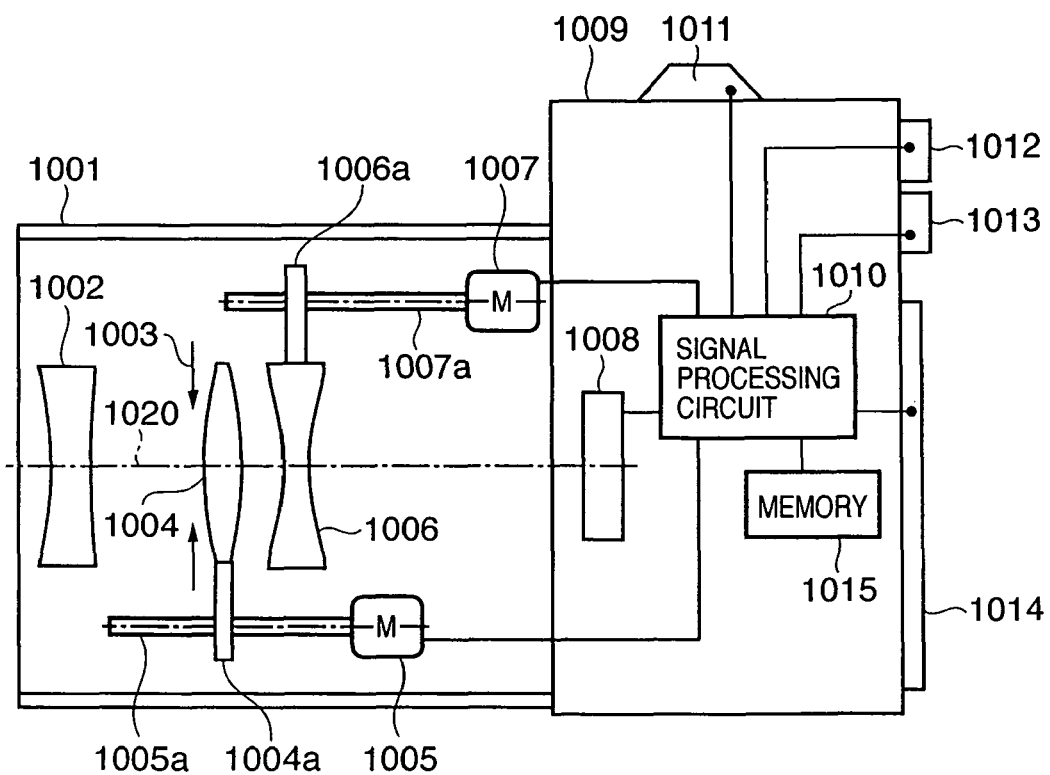
FIG. 2 is a diagram showing the schematic structure of a camera including a zoom lens barrel in a telephoto end state according to the first embodiment of the present invention.

FIG. 2 shows schematically the general structure of the camera in the telephoto end state as a result of the zoom operation.

[Focusing Control at the Telephoto End]

A description will now be given of focusing control at the telephoto end shown in FIG. 2, with reference to FIGS. 3, 5 and 8.

First, a description is given of FIG. 3, at the top of which is shown schematically the arrangement of lens groups in the zoom lens barrel 1001 and the image sensor 1008 in the wide-angle end state, beneath which is shown the lens groups in the arrangement of the zoom lens barrel and the image sensor 1008 in the telephoto-end state. Three graphs are shown at the bottom of the drawing, in which the vertical axis for all three graphs is elapsed time T. The graph on the left shows the lens position on the horizontal axis, showing the track of the movement of the second lens group 1004 and the third lens group 1006 during focusing control. The graph in the center shows focus evaluation values calculated by the signal processing circuit 1010 based on the image signals obtained by the image sensor 1008 on the horizontal axis, whose maximal value indicates an in-focus state. The graph on the right shows focusing sensitivity on the horizontal axis. Focusing sensitivity is the ratio of the amount of movement of the focal plane in the direction of the optical axis to the amount of movement of the moving lens group during focusing control. For example, a focusing sensitivity of −8.5 in which only the third lens group 1006 moves indicates that, when the third lens group 1006 moves 1 μm, the focal plane moves 8.5 μm in the opposite direction. In addition, where the second lens group 1004 and the third lens group 1006 are driven in different amounts as in the first embodiment, the ratio of the amount of movement of the focal plane to the amount of movement of the third lens group is taken to represent the focusing sensitivity.

It is assumed that the lens groups are positioned at the telephoto end and are focused on infinity, with the photographic subject to be sensed positioned 2 m away from the camera.

Figure 8:
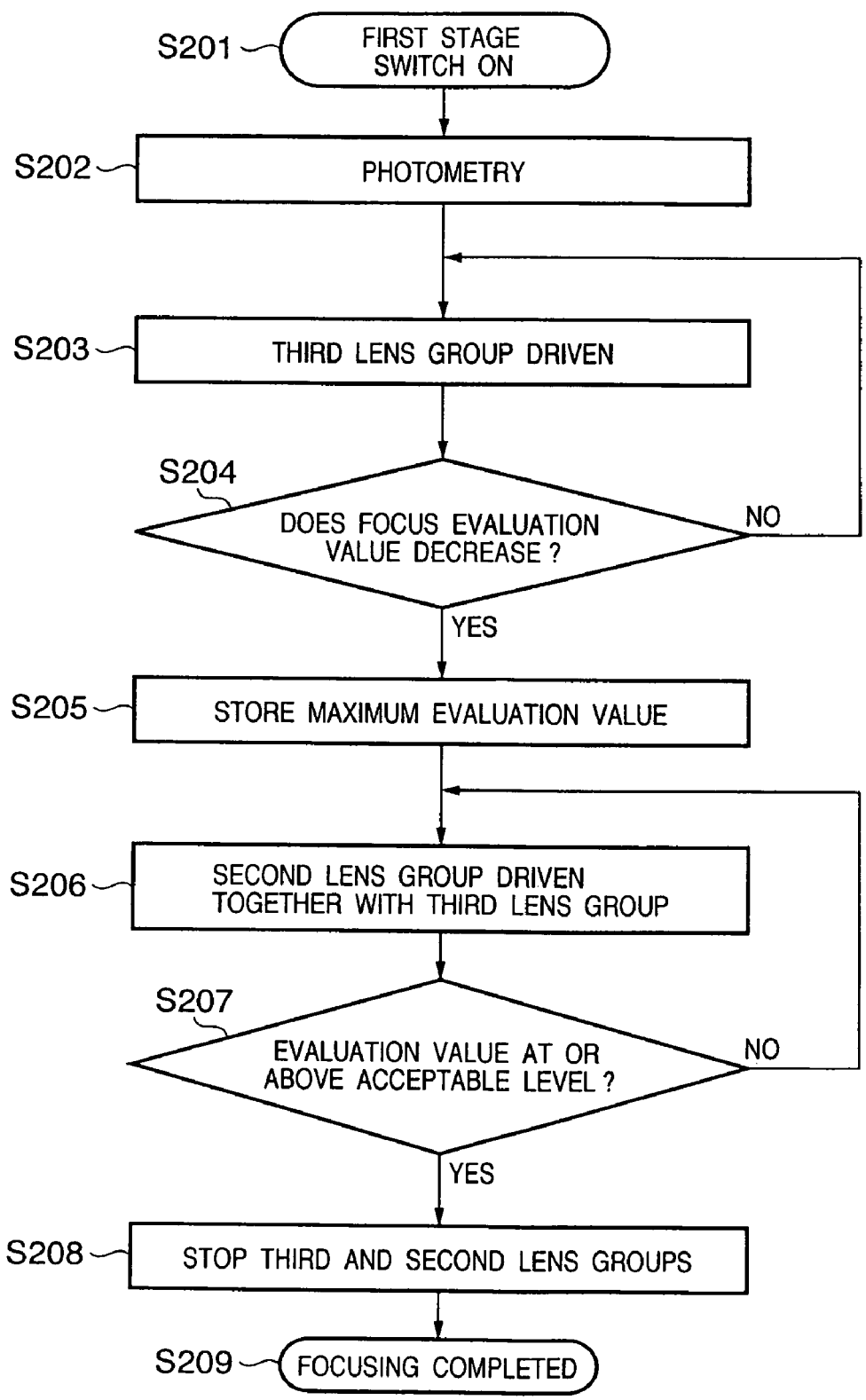
FIG. 8 is a flow chart illustrating focusing control according to the first embodiment of the present invention.

In the focusing control flow chart shown in FIG. 8, the first stage switch is turned on when the release button 1011 is pressed lightly in step S201, and in step S202 photometry is performed based on the amount of light reaching the image sensor 1008.

In step S203, as shown in the left graph in FIG. 3, the third lens group 1006, which is a concave lens system, begins to move linearly toward the image sensor 1008. The focusing sensitivity at this time is −8.5.

Figure 5:
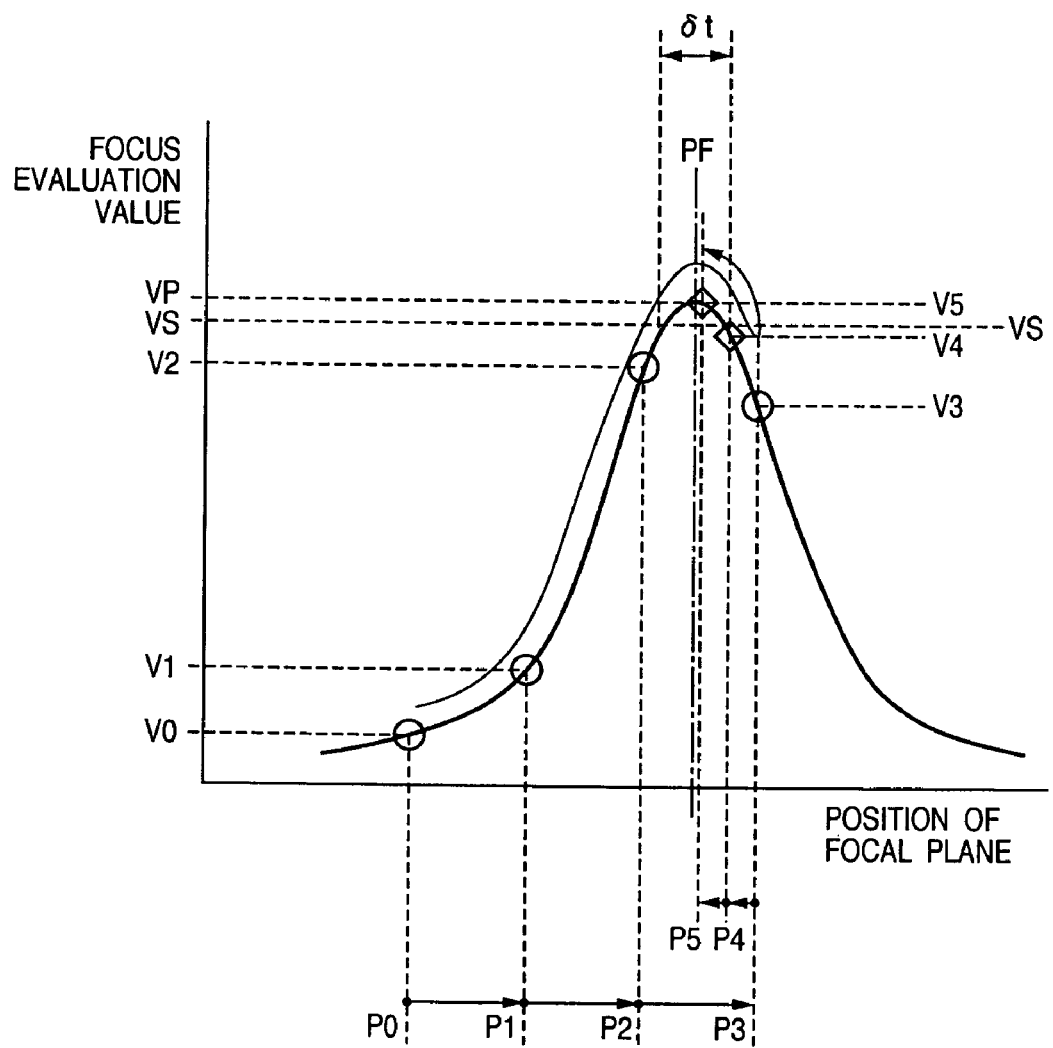
FIG. 5 is a diagram showing the relation between focal plane position and focus evaluation value at the telephoto end according to the first embodiment of the present invention.

In FIG. 5, when the third lens group stepping motor 1007 is driven one step, the third lens group 1006 is driven 12.5 μm toward the image sensor 1008, the position of the focal plane changes from P0 to P1, and the focus evaluation value increases from V0 to V1.

In step S204, it is determined whether or not the focus evaluation value has decreased. In this case, the focus evaluation value has increased, and thus the process returns to step S203.

In step S203, when the third lens group 1006 is driven one step further toward the image sensor 1008, the position of the focal plane changes from P1 to P2. In step S204, since the focus evaluation value increases from V1 to V2, the determination result is NO and processing returns to step S203.

In step S203, when the third lens group 1006 is driven one step further still toward the image sensor 1008, the position of the focal plane changes from P2 to P3. As shown in FIG. 3, the focus evaluation value reaches its maximal value (maximum focus evaluation value) VP at time T1, after which it begins to decline.

In step S204, since the focus evaluation value has decreased from V2 to V3, the determination result is YES and processing proceeds to step S205.

In step S205, the maximum focus evaluation value VP is stored. The position of the focal plane at which the focus evaluation value becomes the maximum focus evaluation value VP is PF (as shown in FIG. 5).

In step S206, using the time T2 shown in FIG. 3 as the starting points for the lens positions, the third lens group 1006 is further driven one step (12.5 μm) toward the image sensor 1008 in the same manner as up to now and at the same speed. At the same time, the second lens group 1004 is driven one step (16.25 μm) toward the image sensor 1008. At this point the focusing sensitivity is 2.4, and the focal plane slowly backtracks. In other words, by moving the third lens group 1006 and the second lens group 1004 simultaneously, fine focusing control is performed.

In FIG. 5, the focal plane position slowly begins to backtrack, moving from P3 to P4, and the focus evaluation value rises from V3 to V4.

In step S207, it is determined whether or not the focus evaluation value is at or above the pass level value VS. In this case, 90 percent of the recorded maximum focus evaluation value VP is considered the pass level value VS, and since the focus evaluation value V4 is below the pass level value VS, processing returns to step S206.

In step S206, the third lens group 1006 and the second lens group 1004 are moved one step, the position of the focal plane shown in FIG. 5 moves from P4 to P5, and the focus evaluation value increases from V4 to V5.

In step S207, since the focus evaluation value V5 exceeds the pass level value VS, it is determined that a fully focused photograph can be sensed and processing proceeds to step S208. The range of positions of the focal plane at which the focus evaluation value meets or exceeds the pass level value VS at the telephoto end is δt as shown in FIG. 5.

In step S208, the driving of the third lens group stepping motor 1007 and the second lens group stepping motor 1005 is stopped, and the third lens group 1006 and the second lens group 1004 stop at the lens positions at time T3 shown in FIG. 3.

In step S209, focusing control is ended.

[Focusing Control at the Wide-Angle End]

A description will now be given of focusing control at the wide-angle end shown in FIG. 1, with reference to FIGS. 4, 6 and 8.

It is assumed that the lens groups are positioned at the wide-angle end and focused on infinity, with the photographic subject to be sensed positioned 2 m away from the camera.

In the focusing control flow chart shown in FIG. 8, the first stage switch is turned on when the release button 1011 is pressed lightly in step S201, and in step S202 photometry is performed based on the amount of light reaching the image sensor 1008.

Figure 4:
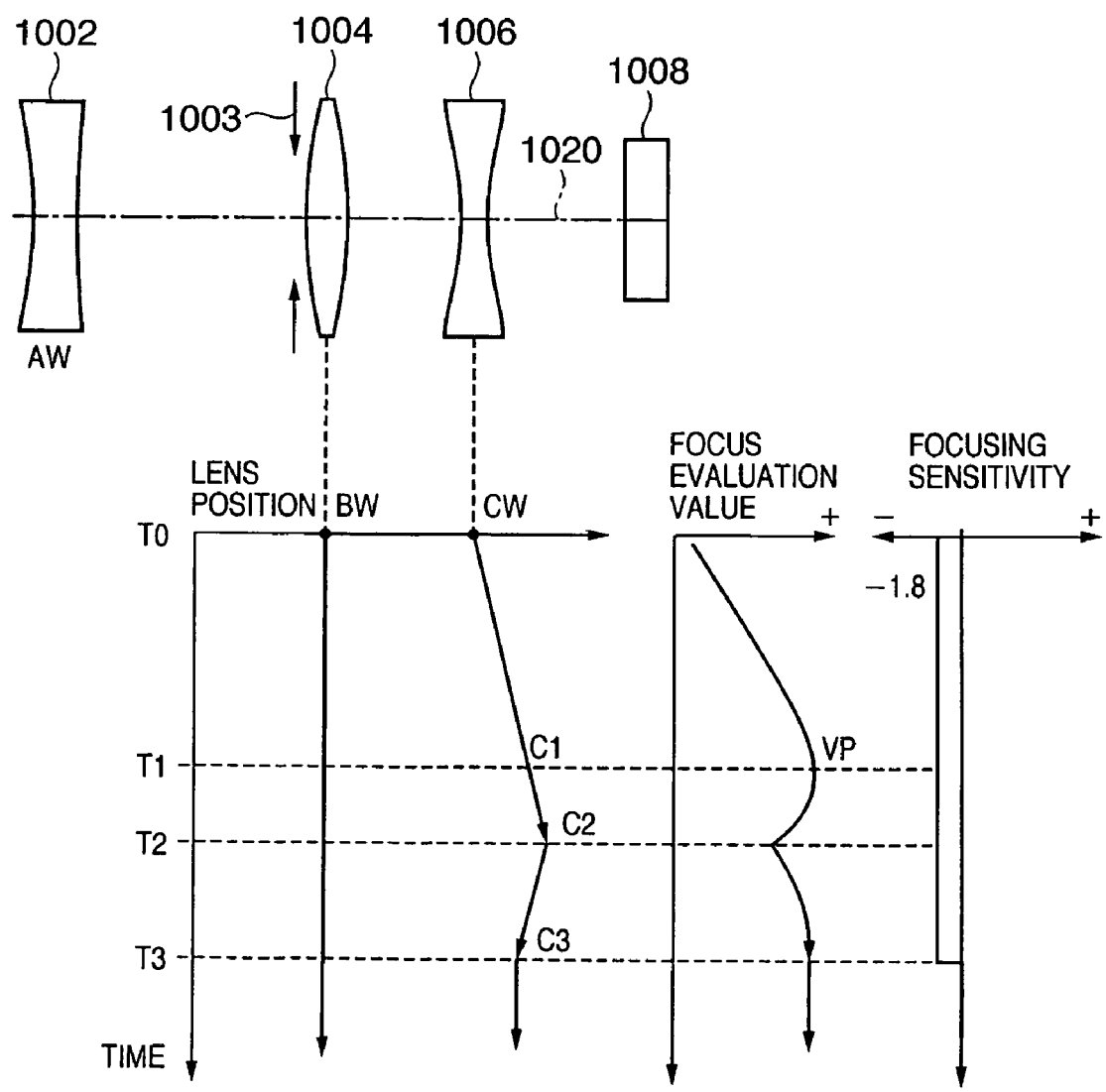
FIG. 4 is a schematic diagram showing focusing control at the wide-angle end according to the first embodiment of the present invention.

In step S203, as shown in the left graph in FIG. 4, the third lens group 1006, which is a concave lens system, begins to move linearly toward the image sensor 1008. The focusing sensitivity at this time is −1.8.

Figure 6:
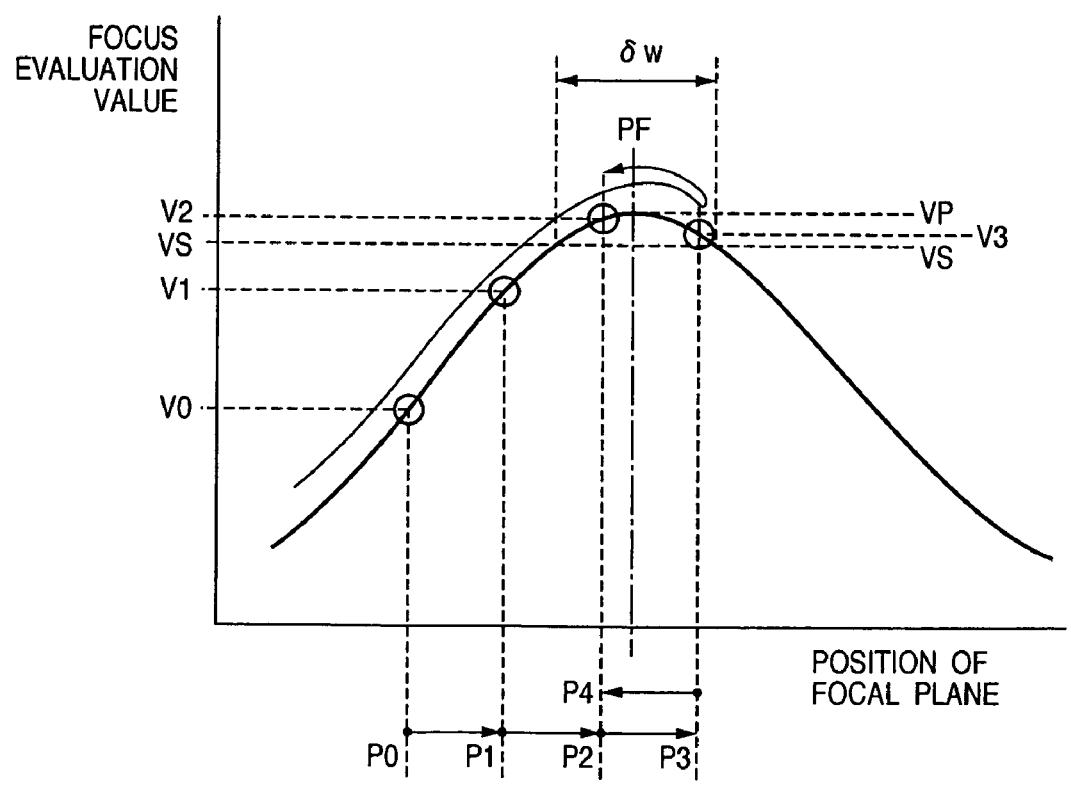
FIG. 6 is a diagram showing the relation between focal plane position and focus evaluation value at the wide-angle end according to the first embodiment of the present invention.

In FIG. 6, when the third lens group stepping motor 1007 is driven one step, the third lens group 1006 is driven 12.5 μm toward the image sensor 1008, the position of the focal plane changes from P0 to P1, and the focus evaluation value increases from V0 to V1.

In step S204, it is determined whether or not the focus evaluation value has decreased. In this case, the focus evaluation value has increased, and thus the process returns to step S203.

In step S203, when the third lens group 1006 is driven one step further toward the image sensor 1008, the position of the focal plane changes from P1 to P2. In step S204, since the focus evaluation value increases from V1 to V2, the determination result is NO and processing returns to step S203. In step S203, when the third lens group 1006 is driven one step further still toward the image sensor 1008, the position of the focal plane changes from P2 to P3. As shown in FIG. 4, the focus evaluation value reaches its maximal value (maximum focus evaluation value) VP at time T1, after which it begins to decline.

In step S204, since the focus evaluation value has decreased from V2 to V3, the determination result is YES and processing proceeds to step S205.

In step S205, the maximum focus evaluation value VP is stored.

In step S206, using the time T2 shown in FIG. 4 as the starting points for the lens positions, the third lens group stepping motor 1007 is driven in reverse, driving the third lens group 1006 one step (12.5 μm) toward the photographic subject. At this point in time, the position of the focal plane backtracks. Although in step S208 in FIG. 8 it is stated that the "second lens group is driven together with third lens group", in the case of focusing control at the wide-angle end this is replaced to read "third lens group is driven in reverse".

In FIG. 6, the position of the focal plane begins to backtrack, moving from position P3 to position P4, and the focus evaluation value returns from V3 to V2, rising.

In step S207, it is determined whether or not the focus evaluation value is at or above the pass level value VS. In this case, 90 percent of the recorded maximum focus evaluation value VP is considered the pass level value VS. Since the focus evaluation value V2 exceeds the pass level value VS, it is determined that a fully focused photograph can be sensed and processing proceeds to step S208.

In step S208, the driving of the third lens group stepping motor 1007 is stopped and the third lens group 1006 stops at the lens position at time T3 shown in FIG. 4.

In step S209, the focusing operation is ended. In FIG. 6, PF is the position of the focal plane at which the focus evaluation value becomes the maximal value VP, and δw is the range of positions of the focal plane where the focus evaluation value at the wide-angle end is at or above the pass level value VS.

[Image Sensing Operation]

A description will now be given of the image sensing and recording operation by activation of the second stage switch of the release button 1011, using FIGS. 9 and 1.

Figure 9:
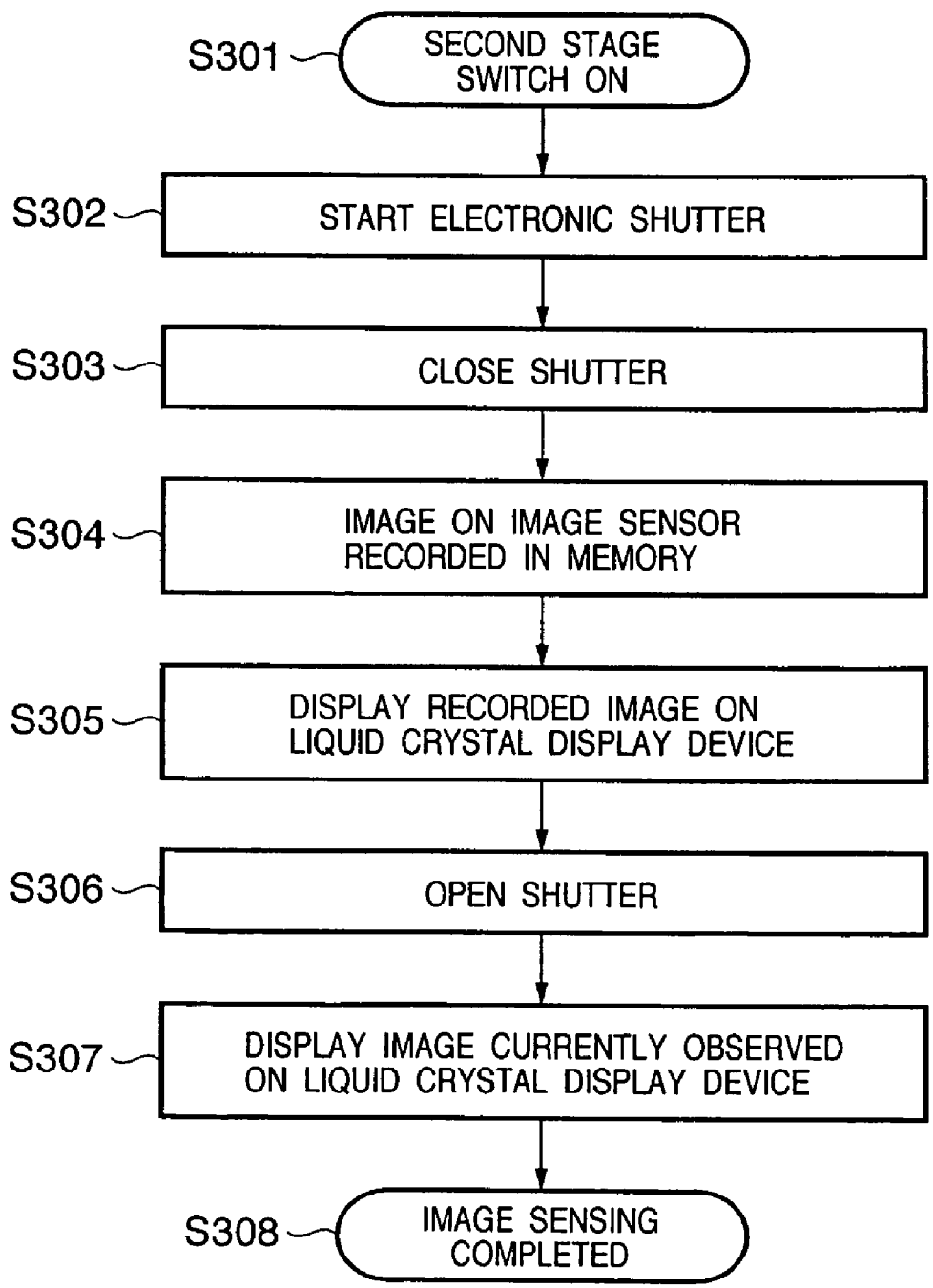
FIG. 9 is a flow chart illustrating an image sensing operation according to the first embodiment of the present invention.

In FIG. 9, when the second stage switch is turned on when the release button 1011 is pressed deeply in step S301, in step S302 the image sensor 1008 begins to be exposed electrically. Such an arrangement is called an electronic shutter because the light is neither blocked nor passed mechanically.

In step S303, once an appropriate exposure value as measured in step S202 described above is attained, the shutter 1003 is closed and exposure ended.

In step S304, the image data stored in the image sensor 1008 is sent to the signal processing circuit 1010 and the image data is recorded in the memory 1015 in a set image compression format.

In step S305, the recorded image is temporarily displayed on the liquid crystal display device 1014 on the back of the camera, enabling the user to check the recorded image.

In step S306, the shutter 1003 is once again opened and the image of the photographic subject is focused on the image sensor 1008.

In step S307, the photographic subject currently being observed is displayed on the liquid crystal display device 1014 on the back of the camera.

In step S308, the image sensing operation is ended.

In the first embodiment, because only the third lens group 1006 is moved at the beginning of focusing control (up to time T2), the time for moving lens groups for focusing control is shortened. At the same time, because focusing sensitivity is reduced by driving the third lens group 1006 and the second lens group 1004 at the end of focusing control (T2-T3), focusing accuracy is improved.

In addition, since the direction of movement of the focal plane can be changed by driving the third lens group 1006 and the second lens group 1004 in combination, there is no need to reverse the direction of movement of the third lens group 1006 and the second lens group 1004 during focusing control. Therefore, no time is lost and thus focusing speed can be increased.

In addition, the third lens group 1006 and the second lens group 1004 are used for both focusing and zooming, and thus there is no need for additional components and the camera can be made more compact.

In addition, by driving the third lens group 1006 and the second lens group 1004 in combination the speed of movement of the focal plane can be slowed, thus enabling the state of focus to be determined accurately and focusing accuracy to be improved.

In addition, since the speeds of movement of the lens groups at the end of focusing control can be held constant, the structure of the circuitry that controls the movement of the lens groups can be simplified and the movement of the lenses can be stabilized as well, thus enabling the camera to be made more compact and focusing accuracy to be improved.

It should be noted that the lead ratio between the lead screws 1007*a* and 1005*a* can be mechanically set to a desired moving speed ratio at the manufacturing stage. Thus, since the moving speed ratio between the lens groups can be set mechanically, focusing accuracy can be improved.

In addition, gross focusing control is performed using only the third lens group 1006 until the contrast evaluation value exceeds its peak. Once the contrast evaluation value exceeds its peak, high-accuracy focusing control is performed using the movement of the third lens group 1006 and the second lens group 1004, thus making it possible both to reduce focusing time as well as enhance focusing accuracy.

In addition, by performing focusing control at the wide-angle end in which a fully accurate in-focus state can be attained without stopping the driving the lens group in the direction of the optical axis with a high degree of accuracy using only the third lens group 1006, focusing speed is increased.

Second Embodiment

A description will now be given of a second embodiment of the present invention, using FIGS. 10 and 11.

In this case, as the method of driving the stepping motors, other than the method of driving the motor at each step which is an electrical pulse number, a drive method called a microstep, in which the driving can also be stopped between steps virtually steplessly, is also used.

In the second embodiment, the structure of the zoom lens barrel and the camera are the same as that of the first embodiment, and therefore a description thereof is omitted.

Figure 10:
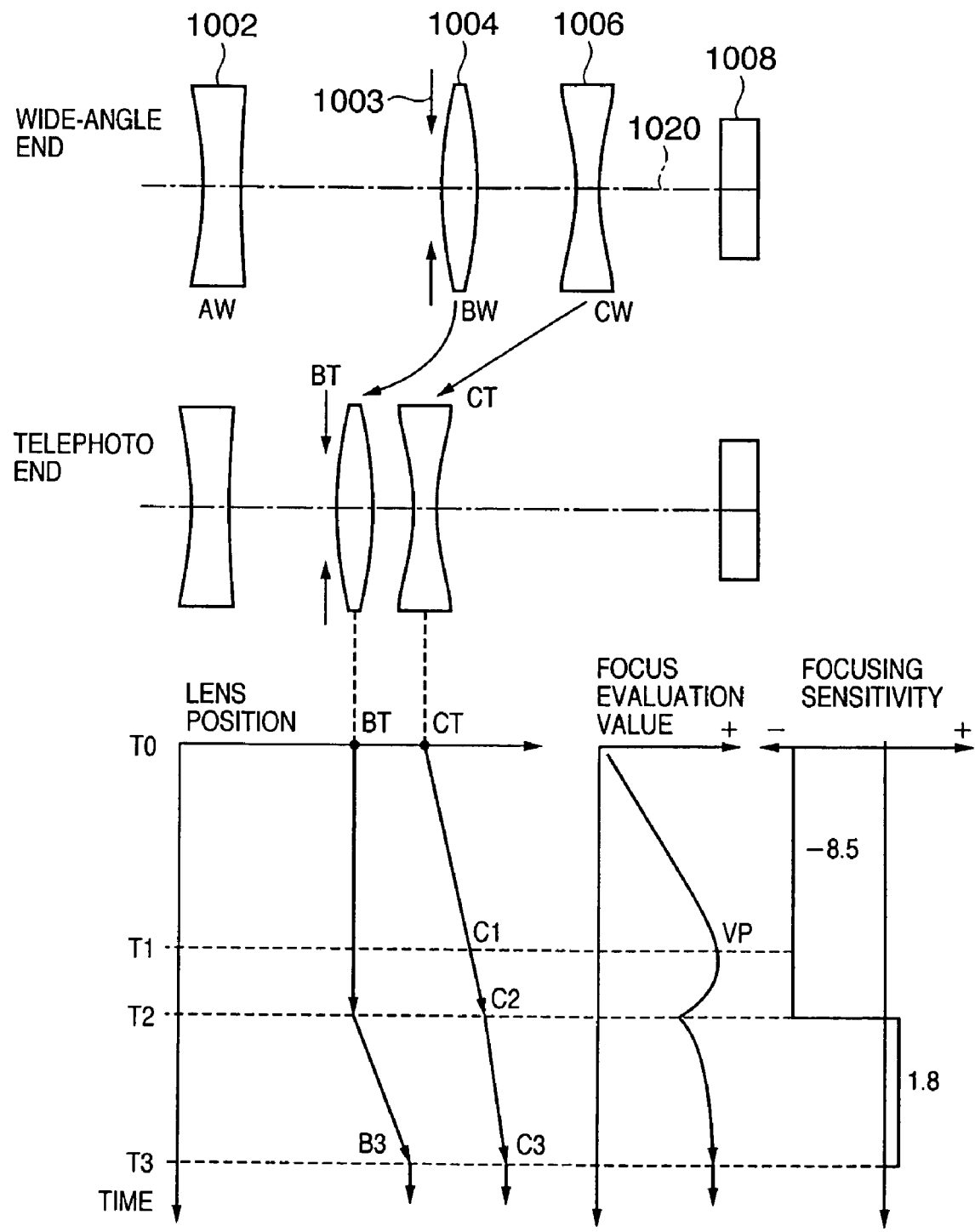
FIG. 10 is a schematic diagram showing the relative positions of zoom lens groups at the telephoto end and the wide-angle end and focusing control at the telephoto end according to a second embodiment of the present invention.

The focusing control at the telephoto end in FIG. 10 involves referencing focus evaluation values obtained from image data of the image sensor 1008 while driving the third lens group 1006, which is a concave lens, toward the image sensor 1008 at a constant speed. At this time, the focusing sensitivity is −8.5. At time T1, the focus evaluation value is at its maximal value (maximum focus evaluation value) VP, after which it decreases. Accordingly, the maximal value VP is stored and, at time T2 at the next step position P3, the rotation speed of the third lens group stepping motor 1007 is decreased, and further, the second lens group stepping motor 1005 is started, driving the second lens group 1004 by microstep drive by an amount that is 1.6 times the amount of movement of the third lens group 1006. By so doing, the focusing sensitivity reverses from negative to positive, to an absolute value 1.8 that is below what it was at the beginning of focusing control, resulting in finer movement of the focal plane.

Figure 11:
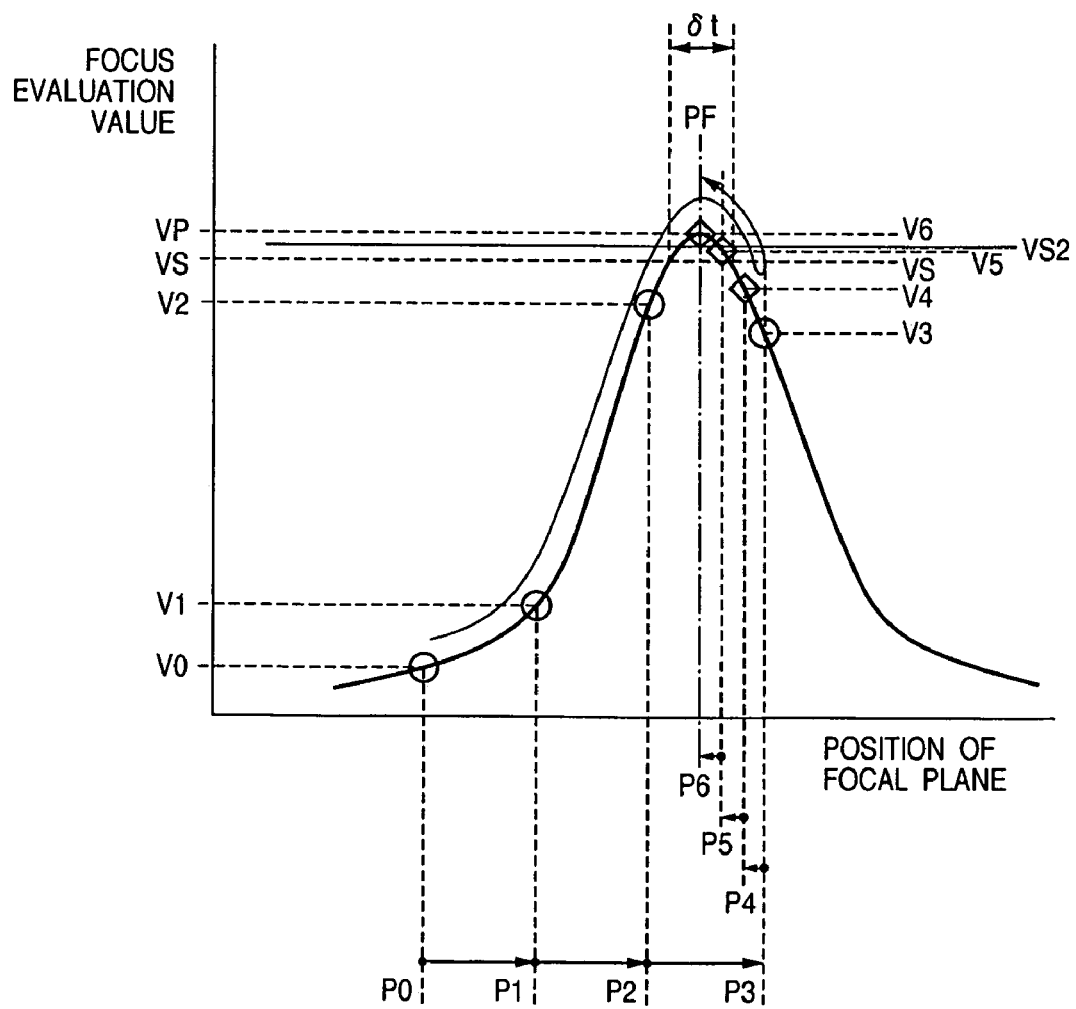
FIG. 11 is a diagram showing the relation between focal plane position and focus evaluation value at the telephoto end according to the second embodiment of the present invention.

In FIG. 11, since the focus evaluation value V4 at the position of the focal plane P4, which is slightly backtracked toward the position P3, is below the pass level value VS, the third lens group 1006 and the second lens group 1004 are driven at a ratio of 1 to 1.6. At focal plane position P5, a focus evaluation value V5 exceeds the pass level value VS and a fully focused photograph can be sensed. However, the lens groups 1004 and 1006 are driven further to a focal plane position P6 at which the focus evaluation value V6 exceeds a stricter pass level value VS2, whereupon the lens groups 1004, 1006 are stopped.

In this case, the pass level value VS is the same 90 percent of the maximum focus evaluation value VP as in the first embodiment, with the stricter pass level value VS2 being 95 percent of the maximal value VP.

Third Embodiment

A description will now be given of a third embodiment of the present invention, using FIGS. 12 and 13.

In the third embodiment, the structure of the zoom lens barrel and the camera are the same as that of the first embodiment, and therefore a description thereof is omitted.

In the third embodiment, from the beginning of focusing control the third lens group 1006 and the second lens group 1004 are driven at a certain speed ratio to focus.

In this case, the amounts that the lens groups are driven per stepping motor pulse are different from those of the first embodiment. The lead of the lead screw 1005a of the second lens group stepping motor 1005 is 0.35 mm/lead. Forty control pulses cause the second lens group stepping motor 1005 to make one rotation. In other words, when the second lens group stepping motor 1005 rotates one step, the second lens group 1004 moves 8.7 μm. The lead of the lead screw 1007a of the third lens group stepping motor 1007 is 0.50 mm/lead. Forty control pulses cause the third lens group stepping motor 1007 to make one rotation. In other words, the third lens group 1006 stepping motor 1007 rotates one step, the third lens group 1006 moves 12.5 μm.

Thus, as described above, the ratio of the amount of movement of the second lens group 1004 to that of the third lens group 1006 when one pulse is applied to the stepping motors 1005 and 1007 is 0.35/0.50=0.7 to 1.

Figure 12:
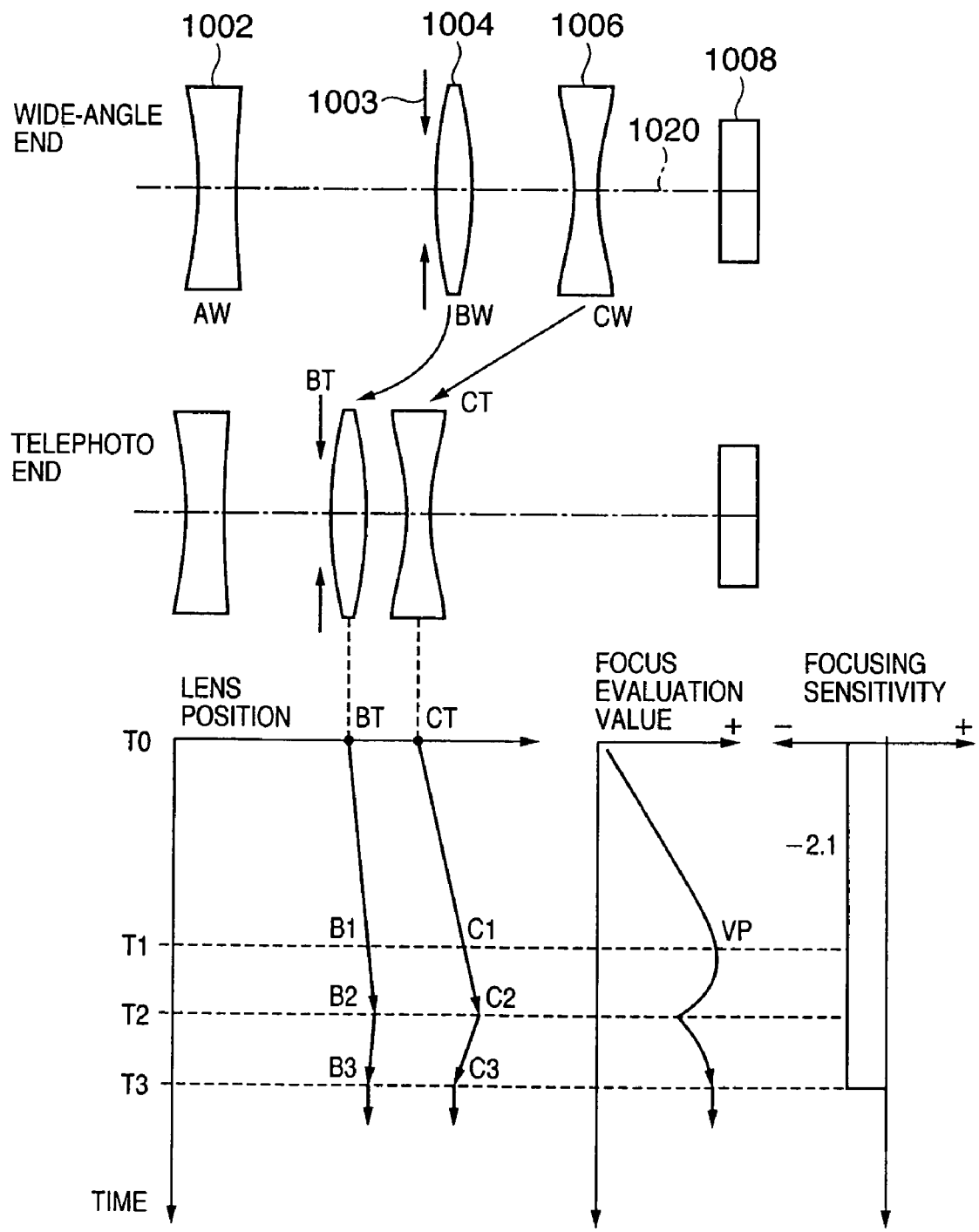
FIG. 12 is a schematic diagram showing the relative positions of zoom lens groups at the telephoto end and the wide-angle end and focusing control at the telephoto end according to a third embodiment of the present invention.

In the focusing control at the telephoto end, as shown in FIG. 12, focus evaluation values obtained from the image data of the image sensor 1008 are referenced while from time T0 the two stepping motors 1005, 1007 are driven an identical number of pulses so as to move the third lens group 1006, which is a concave lens, and the second lens group 1004, which is a convex lens, toward the image sensor 1008 at a constant speed by a movement amount ratio of 1 to 0.7. At this point in time the focusing sensitivity is −2.1.

At time T1, the focus evaluation value reaches its maximal value VP and thereafter begins to decline, and thus the maximum value VP is stored. At time T2, at the next focal plane position P8, the direction of rotation of the second lens group stepping motor 1005 and the third lens group stepping motor 1007 is reversed, thereby reversing the direction of movement of the focal plane.

Figure 13:
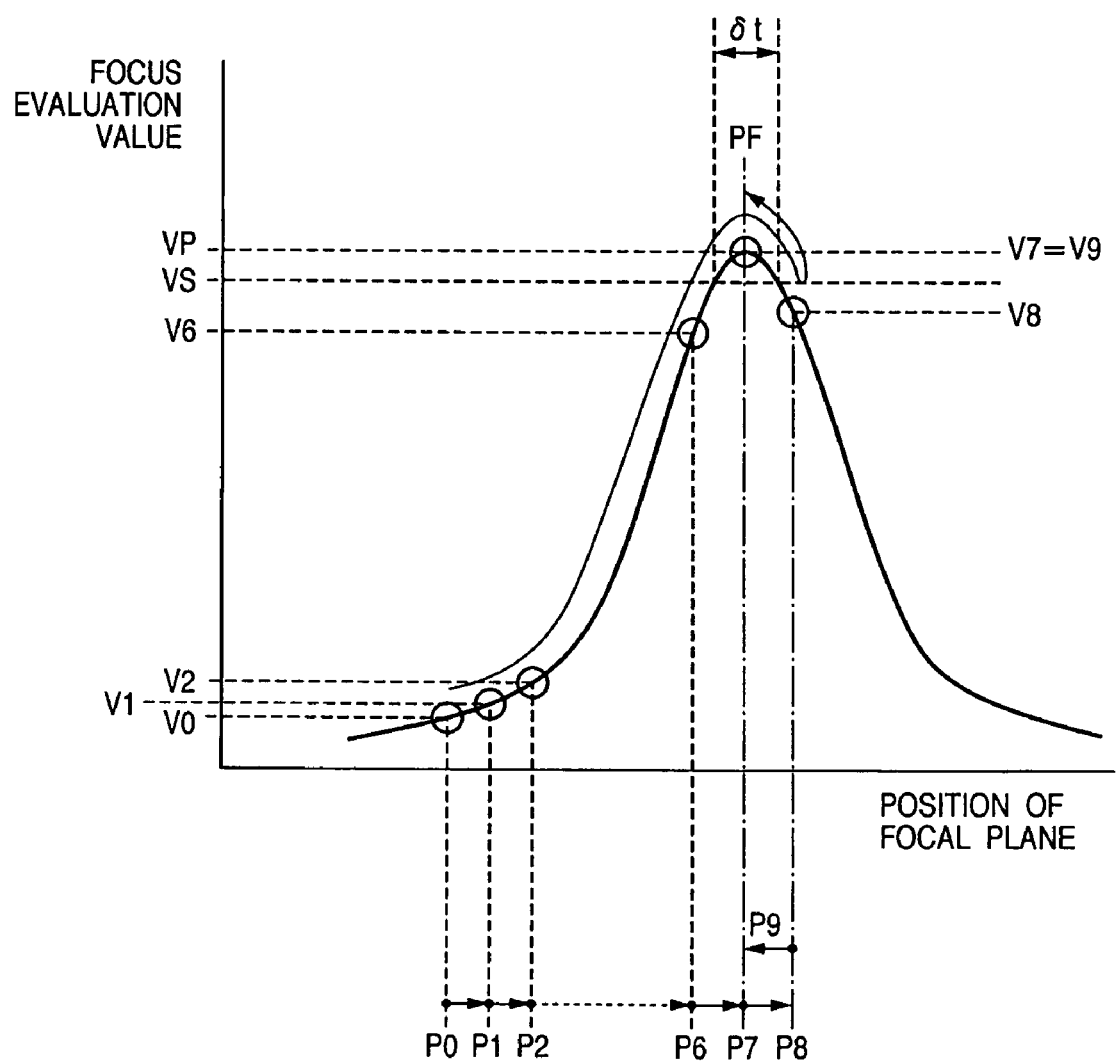
FIG. 13 is a diagram showing the relation between focal plane position and focus evaluation value at the telephoto end according to the third embodiment of the present invention.

As shown in FIG. 13, the focus evaluation value V9 at focal plane position P9, which is slightly backtracked toward the position P8, exceeds the pass level value VS indicating that a fully focused photograph can be sensed, at which point the two lens groups 1004, 1006 are stopped.

In this case, as in the first embodiment, the pass level value VS is 90 percent of the maximum value VP.

In the third embodiment, since the third lens group 1006 and the second lens group 1004 are moved at a uniform speed ratio throughout focusing control, focusing sensitivity decreases, thereby enabling the control method to be simplified and also stabilizing drive accuracy. As a result, the zoom lens barrel can be made more compact and focusing accuracy can be improved.

Fourth Embodiment

A description will now be given of a fourth embodiment of the present invention, using FIGS. 14 and 15.

In the fourth embodiment, the structure of the zoom lens barrel and the camera are the same as in the first embodiment, and therefore a description thereof is omitted.

In the fourth embodiment, at the beginning of focusing control, focusing control is performed using only the third lens group 1006. At the end of focusing control, both the third lens group 1006 and the second lens group 1004 are driven in a certain ratio of speed to focus.

In this case, the amounts the lens groups are driven per stepping motor pulse are different from those of the first embodiment. The lead of the lead screw 1005a of the second lens group stepping motor 1005 is 0.35 mm/lead. Forty control pulses cause the second lens group stepping motor 1005 to make one rotation. In other words, when the second lens group stepping motor 1005 rotates one step, the second lens group 1004 moves 8.7 μm. The lead of the lead screw 1007a of the third lens group stepping motor 1007 is 0.50 mm/lead.

Forty control pulses cause the third lens group stepping motor 1007 to make one rotation. In other words, when the third lens group stepping motor 1007 rotates one step, the third lens group 1006 moves 12.5 μm.

Thus, as described above, the ratio of the amount of movement of the second lens group 1004 to that of the third lens group 1006 when one pulse is applied to the stepping motors 1005, 1007 is 0.35/0.50=0.7 to 1.

Figure 14:
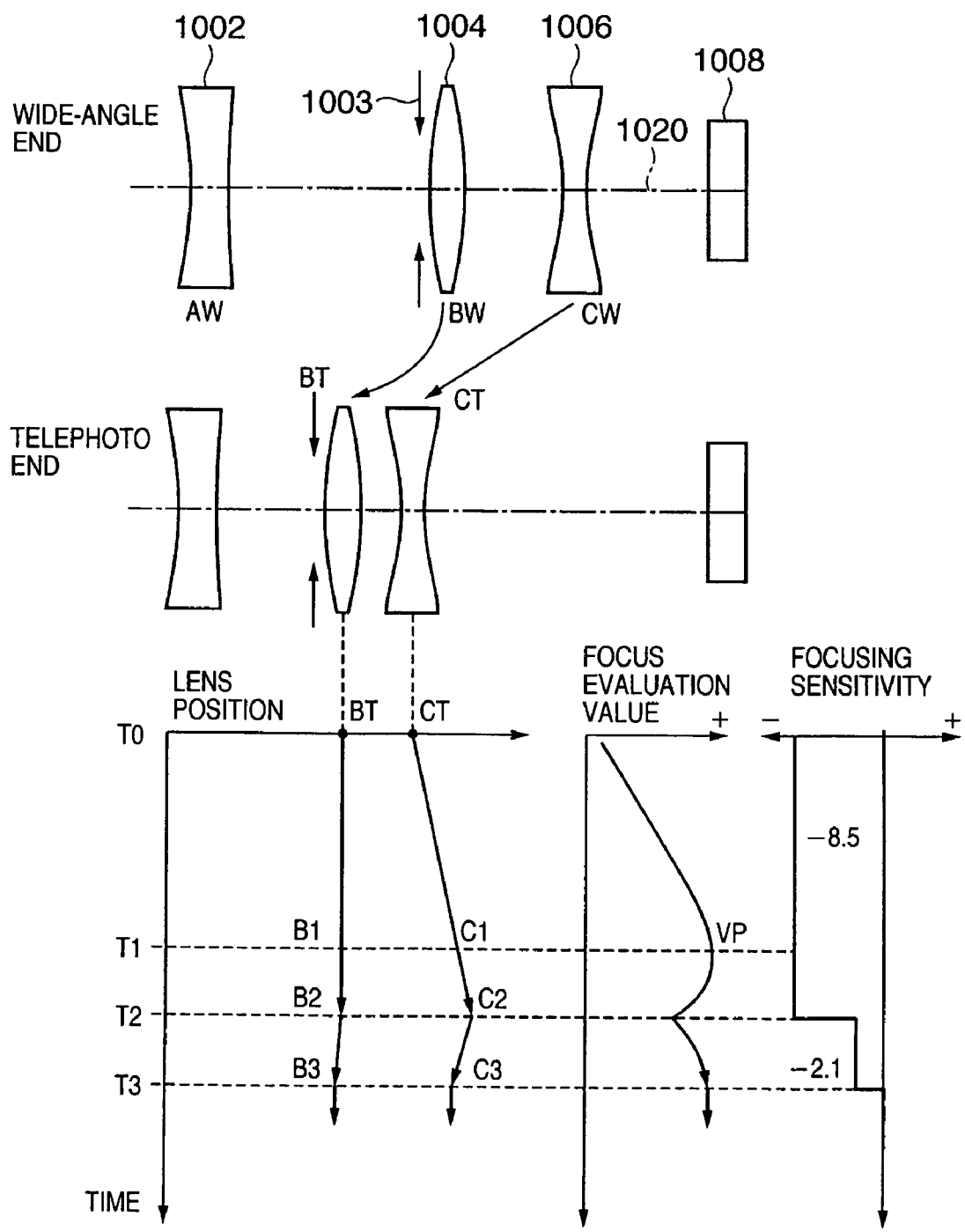
FIG. 14 is a schematic diagram showing the relative positions of zoom lens groups at the telephoto end and the wide-angle end and focusing control at the telephoto end according to a fourth embodiment of the present invention.

In the focusing control at the telephoto end, as shown in FIG. 14, focus evaluation values obtained from the image data of the image sensor 1008 are referenced while the third lens group 1006, which is a concave lens, is driven toward the image sensor 1008 at a constant speed. At this point in time the focusing sensitivity is −8.5. At time T1, the focus evaluation value reaches its maximal value (maximum focus evaluation value) VP and thereafter begins to decline, and thus the maximum value VP is stored and, at time T2, at the next step position P3, the direction of rotation of the third lens group stepping motor 1007 is reversed, and further, the second lens group stepping motor 1005 begins to rotate, driving the second lens group 1004 and the third lens group 1006 in a movement amount ratio of 0.7 to 1.

By the foregoing, the focusing sensitivity reverses from negative to positive, to a value of −2.1 that is below what it was at the beginning of focusing control, resulting in finer movement of the focal plane.

Figure 15:
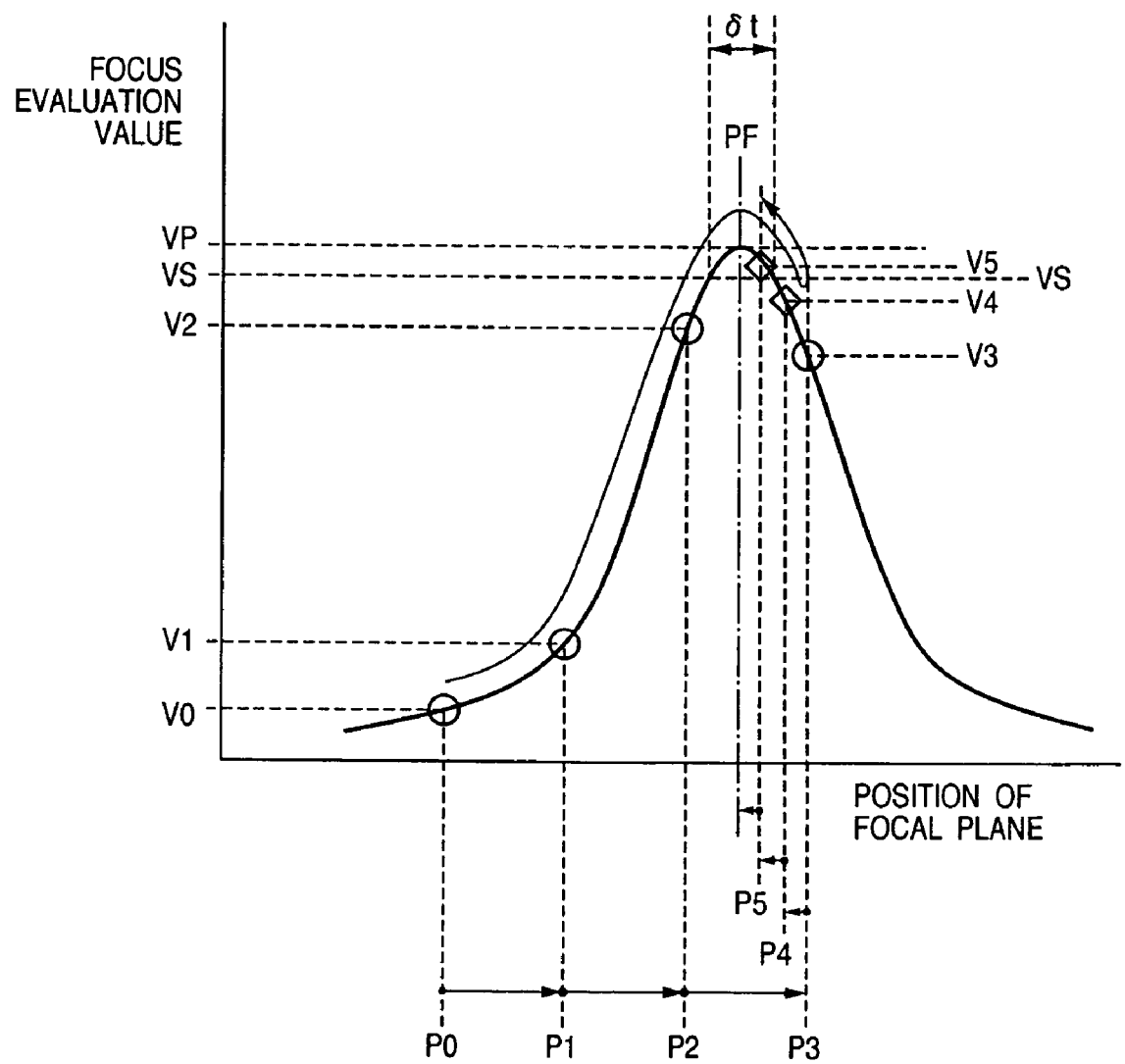
FIG. 15 is a diagram showing the relation between focal plane position and focus evaluation value at the telephoto end according to the fourth embodiment of the present invention.

As shown in FIG. 15, the focus evaluation value V4 at focal plane position P4, which is slightly backtracked toward the position P3, is below the pass level value VS, and thus the third lens group 1006 and the second lens group 1004 are moved further in a movement amount ratio of 1 to 0.7 to focal plane position P5, where the focus evaluation value V5 exceeds the pass level value VS and a fully focused photograph can be sensed, at which point the two lens groups 1004, 1006 are stopped.

In this case, as in the first embodiment, the pass level value VS is 90 percent of the maximum value VP.

Fifth Embodiment

In a fifth embodiment, only the third lens group 1006 is driven at the beginning of focusing control at the telephoto end (that is, time T0-T2), and only the second lens group 1004 is driven at the end of focusing control (T2-T3), respectively.

[Focusing Control at the Telephoto End]

A description will now be given of focusing control in the telephoto end state, using FIGS. 16, 18 and 20.

Figure 16:
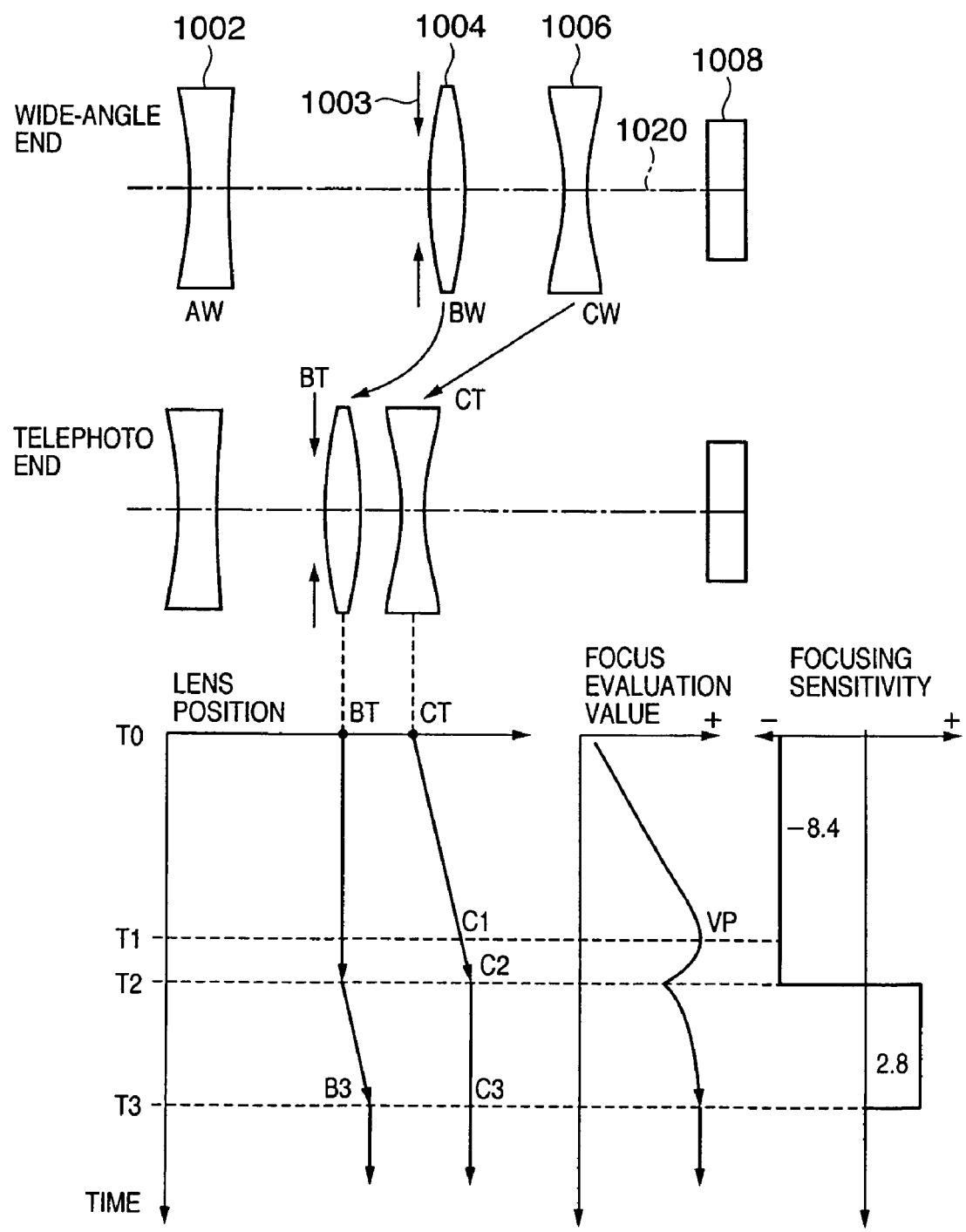
FIG. 16 is a schematic diagram showing the relative positions of zoom lens groups at the telephoto end and the wide-angle end and focusing control at the telephoto end according to a fifth embodiment of the present invention.

First, a description is given of FIG. 16, at the top of which is shown schematically the arrangement of lens groups in the zoom lens barrel 1001 and the image sensor 1008 in the wide-angle end state, beneath which is shown the arrangement of the lens groups in the zoom lens barrel 1001 and the image sensor 1008 in the telephoto-end state. Three graphs are shown at the bottom of the drawing, in which the vertical axis for all three graphs is elapsed time T. The graph on the left shows the lens position on the horizontal axis, showing the tracks of the movement of the second lens group 1004 and the third lens group 1006 during focusing control. The graph in the center shows focus evaluation values calculated by the signal processing circuit 1010 based on the image signals obtained by the image sensor 1008 on the horizontal axis, whose maximal value indicates an in-focus state. The graph on the right shows focusing sensitivity on the horizontal axis. Focusing sensitivity is a ratio of the amount of movement of the focal plane in the direction of the optical axis to the amount of movement of the moving lens group during focusing control. For example, a focusing sensitivity of −8.4 in which only the third lens group 1006 moves indicates that, when the third lens group 1006 moves 1 μm, the focal plane moves 8.4 μm in the opposite direction. In addition, where the second lens group 1004 and the third lens group 1006 are driven in different amounts as in this fifth embodiment, the ratio of the amount of movement of the focal plane to the amount of movement of the third lens group is taken to represent the focusing sensitivity.

It is assumed that the lens groups are positioned at the telephoto end and are focused on infinity, with the photographic subject to be sensed positioned 2 m away from the camera.

Figure 20:
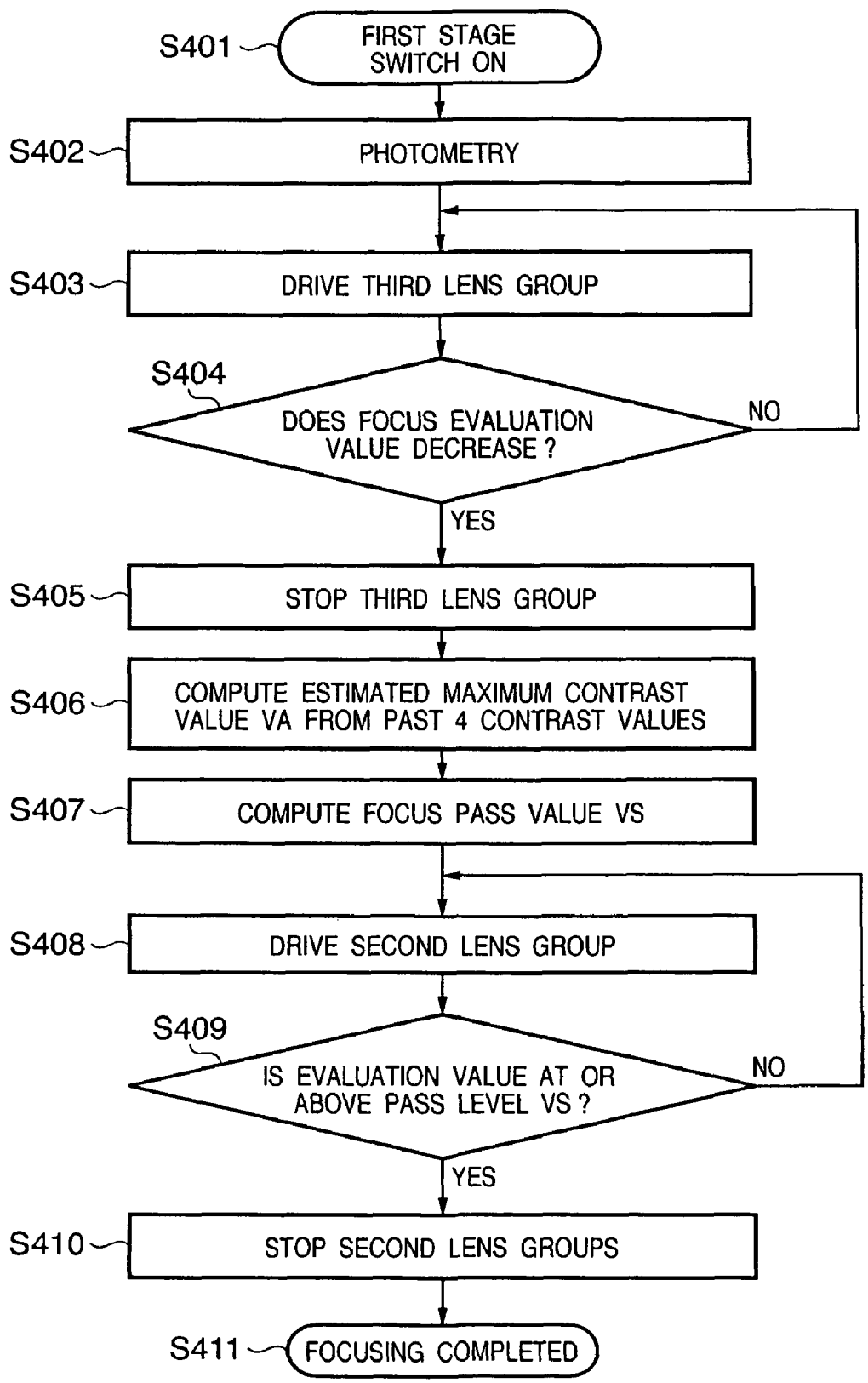
FIG. 20 is a flow chart illustrating focusing control according to the fifth embodiment of the present invention.

In the focusing control flow chart shown in FIG. 20, the first stage switch is turned on when the release button 1011 is pressed lightly in step S401, and in step S402 photometry is performed based on the amount of light reaching the image sensor 1008.

In step S403, as shown in the left graph in FIG. 16, the third lens group 1006, which is a concave lens system, begins to move linearly toward the image sensor 1008. The focusing sensitivity at this time is −8.4.

Figure 18:
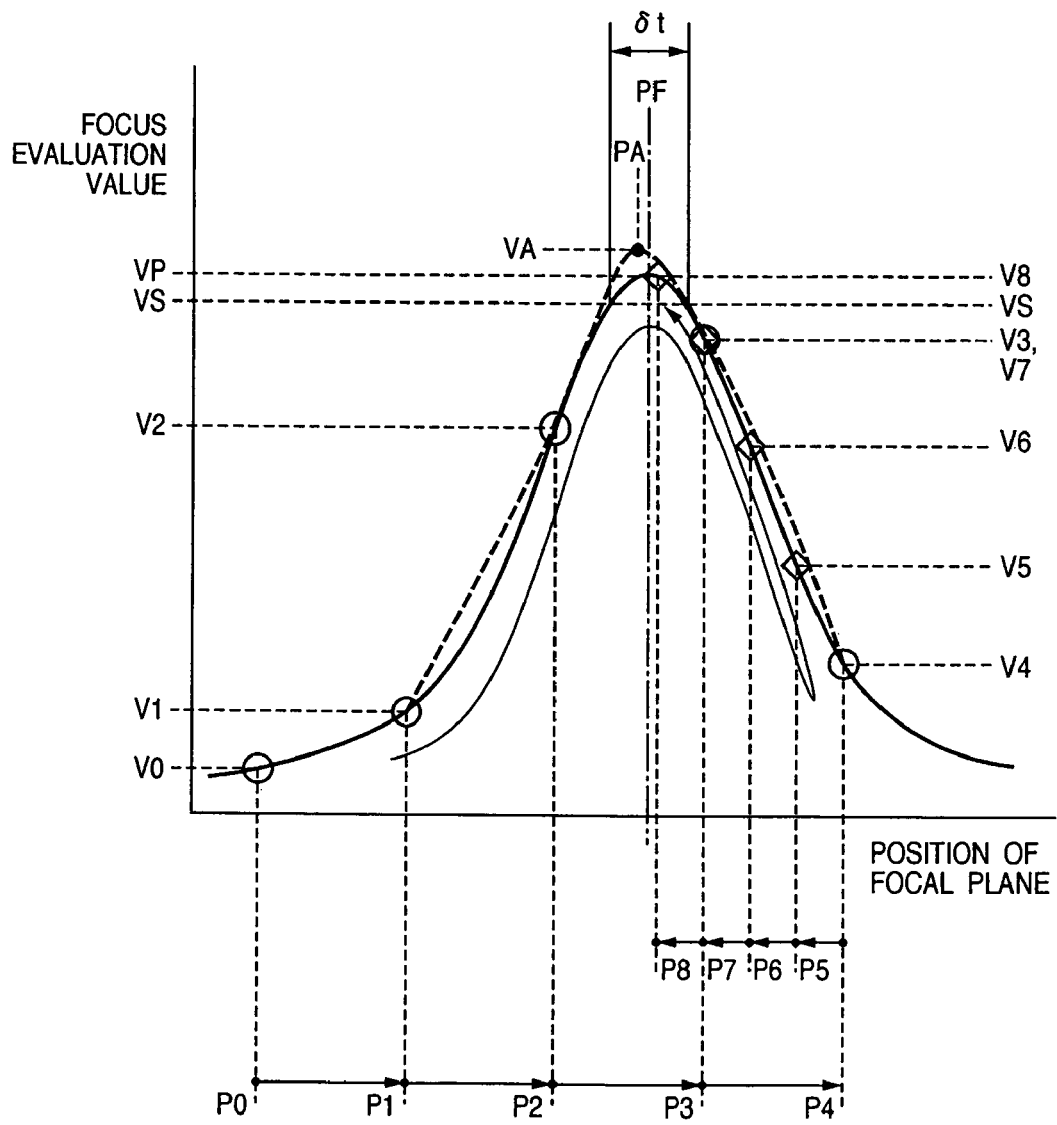
FIG. 18 is a diagram showing the relation between focal plane position and focus evaluation value at the telephoto end according to the fifth embodiment of the present invention.

In FIG. 18, when the third lens group stepping motor 1007 is driven one step, the third lens group 1006 is driven 5 μm toward the image sensor 1008, the position of the focal plane changes from P0 to P1, and the focus evaluation value increases from V0 to V1.

In step S404, it is determined whether or not the focus evaluation value has decreased. In this case, the focus evaluation value has increased, and thus the process returns to step S403.

In step S403, when the third lens group 1006 is further driven one step toward the image sensor 1008, the position of the focal plane changes from P1 to P2. In step S404, since the focus evaluation value increases from V1 to V2, the determination result is NO and processing returns to step S403.

In step S403, when the third lens group 1006 is driven one step further still toward the image sensor 1008, the position of the focal plane changes from P2 to P3. In step S404, since the focus evaluation value has decreased from V2 to V3, the determination result is NO and processing returns to step S403.

In step S403, when the third lens group 1006 is driven one step further still toward the image sensor 1008, the position of the focal plane changes from P3 to P4. As shown in FIG. 16, the focus evaluation value reaches its maximal value (maximum focus evaluation value) at time T1, after which is begins to decline.

In step S404, since the focus evaluation value has decreased from V3 to V4, the determination result is YES and processing proceeds to step S405.

In step S405, the third lens group 1006 is stopped.

In step S406, a focus evaluation value estimated maximum value VA is obtained from a multidimensional formula that passes through the focus evaluation values (V1, V2, V3, V4) of the past four points (P1, P2, P3, P4).

In step S407, the focus pass value is calculated as VS=0.9× VA.

In step S408, using the time T2 shown in FIG. 16 as the starting points for the lens positions, the second lens group 1004 is further driven one step (5 μm) toward the image sensor 1008. At this point the focusing sensitivity is 2.8, and the focal plane slowly backtracks.

In FIG. 18, the focal plane position slowly begins to backtrack, moving from positions P4 to P5, and the focus evaluation value rises from V4 to V5.

In step S409, it is determined whether or not the focus evaluation value is at or above the pass level value VS. In this case, since the focus evaluation value V5 is below the pass level value VS, processing returns to step S406.

Step S409 and step S408 are repeated for a time, after which, at the next step S408, the second lens group 1004 is moved one step, the position of the focal plane in FIG. 18 moves from P7 to P8, and the focus evaluation value increases from V7 to V8.

In step S409, since the focus evaluation value V8 exceeds the pass level value VS, it is determined that a fully focused photograph can be sensed and processing therefore proceeds to step S410.

In step S410, movement of the second lens group stepping motor 1005 is stopped, thereby the second lens group 1004 is stopped at the lens position at time T3 shown in FIG. 16.

In step S411, focusing control is ended.

As described above, because the image must be read into the signal processing circuit 1010, the focus evaluation value can only be calculated at each step of the lens groups. As a result, the focus evaluation value maximum value often falls between steps. In this case, by estimating the maximum value, better-focused photographs can be sensed.

In this case, in contrast to the −8.4 focusing sensitivity of the third lens group 1006, the second lens group 1004 focusing sensitivity is 2.8, or one third as large in absolute terms. As a result, when the stepping motors are driven the same number of steps, the focus of the second lens group 1004 can be moved with three times the sensitivity of the third lens group 1006 focus. Accordingly, by moving the second lens group 1004 at the end of focusing control it becomes possible to achieve high-accuracy focusing control.

[Focusing Control at the Wide-Angle End]

A description will now be given of focusing control in the wide-angle end state using FIGS. 17, 19 and 20.

It is assumed that the lens groups are positioned at the wide-angle end and focused on infinity, with the photographic subject to be sensed positioned 2 m away from the camera.

In the focusing control flow chart shown in FIG. 20, the first stage switch is turned on when the release button 1011 is pressed lightly in step S401, and in step S402 photometry is performed based on the amount of light reaching the image sensor 1008.

Figure 17:
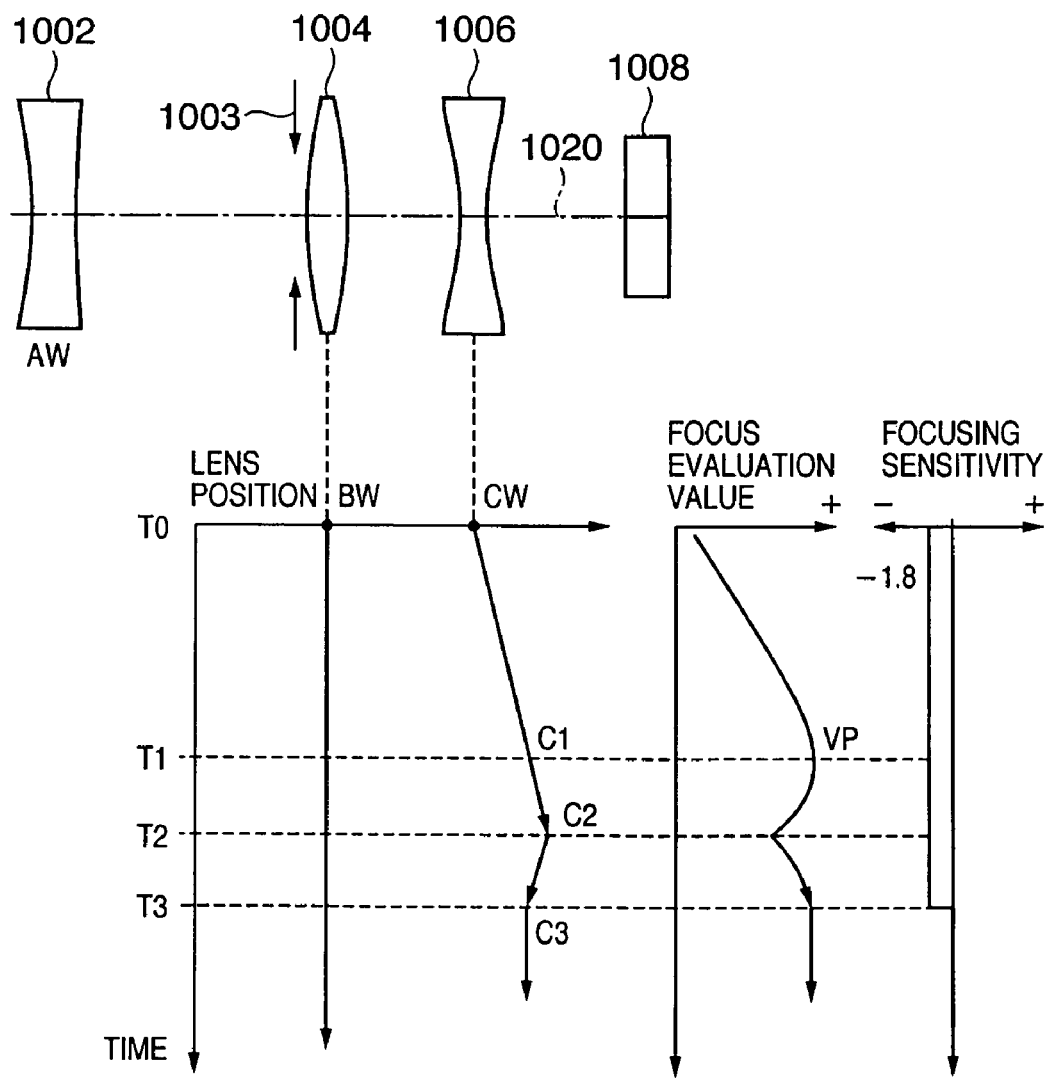
FIG. 17 is a schematic diagram showing the focusing control at the wide-angle end according to the fifth embodiment of the present invention.

In step S403, as shown in the left graph in FIG. 17, the third lens group 1006, which is a concave lens system, begins to move linearly toward the image sensor 1008. The focusing sensitivity at this time is −1.8.

Figure 19:
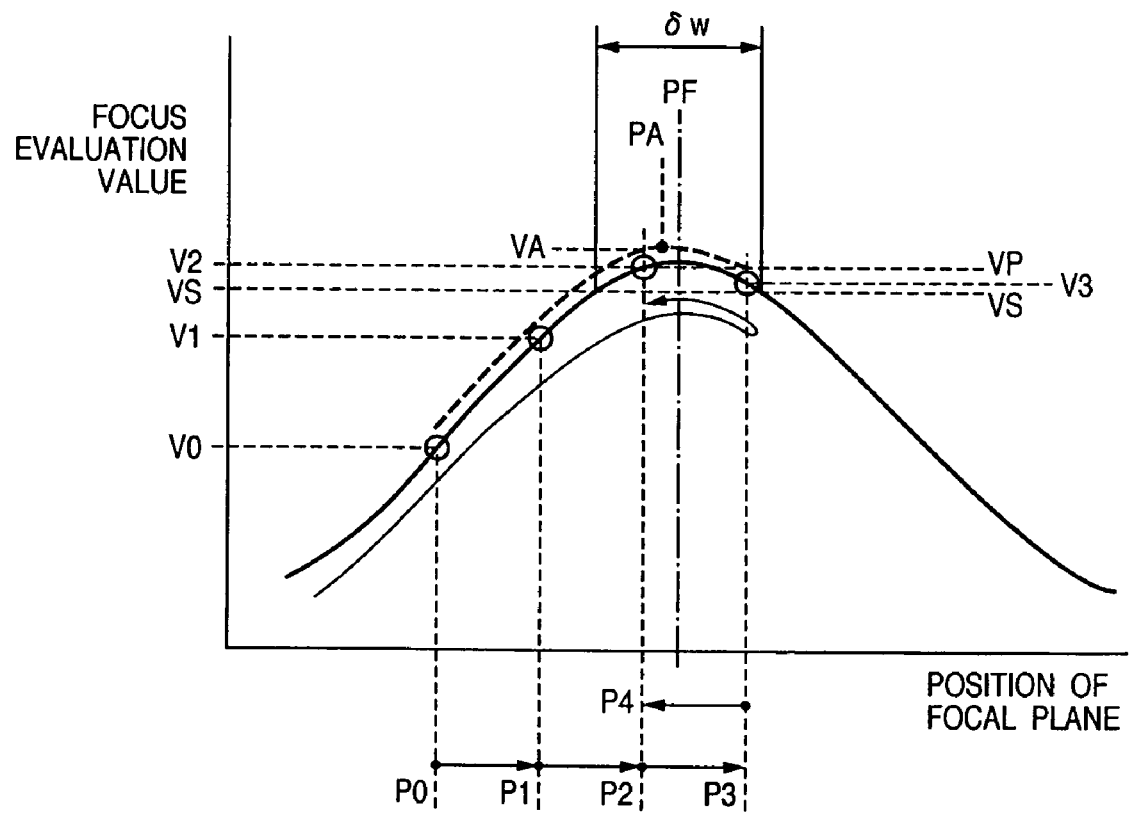
FIG. 19 is a diagram showing the relation between focal plane position and focus evaluation value at the wide-angle end according to the fifth embodiment of the present invention.

In FIG. 19, when the third lens group stepping motor 1007 is driven one step, the third lens group 1006 is driven 5 μm toward the image sensor 1008, the position of the focal plane changes from P0 to P1 and the focus evaluation value increases from V0 to V1.

In step S404, it is determined whether or not the focus evaluation value has decreased. In this case, the focus evaluation value has increased, and thus the process returns to step S403.

In step S403, when the third lens group 1006 is driven one step further toward the image sensor 1008, the position of the focal plane changes from P1 to P2. In step S404, since the focus evaluation value increases from V1 to V2, the determination result is NO and processing returns to step S403.

In step S403, when the third lens group 1006 is driven one step further toward the image sensor 1008, the position of the focal plane changes from P2 to P3. In FIG. 16, the focus evaluation value reaches its maximal value (maximum focus evaluation value) VP at time T1, after which it begins to decline.

In step S404, since the focus evaluation value has decreased from V2 to V3, the determination result is YES and processing proceeds to step S405.

In step S405, the third lens group 1006 is stopped.

In step S406, the focus evaluation value estimated maximum value VA is obtained from a multidimensional formula that passes through the focus evaluation values (V1, V2, V3, V4) of the past four points (P1, P2, P3, P4).

In step S407, the focus pass value is calculated as VS=0.9× VA.

In step S408, using the time T2 shown in FIG. 17 as the starting points for the lens positions, the third lens group stepping motor 1007 is rotated in reverse, driving the third lens group 1006 one step (5 μm) toward the photographic subject. At this point in time, the focal plane backtracks. Although step S408 in FIG. 20 is stated as "drive second lens group", in the case of focusing control at the wide-angle end this is replaced to read "drive third lens group in reverse".

In FIG. 19, the focal plane position begins to backtrack, moving from positions P3 to P4, and the focus evaluation value backtracks and rises from V3 to V2.

In step S409, it is determined whether or not the focus evaluation value is at or above the pass level value VS. In this case, since the focus evaluation value V2 exceeds the pass level value VS, it is determined that a fully focused photograph can be sensed and processing therefore proceeds to step S410. Although step S410 in FIG. 20 is given as "stop second lens group", in the case of focusing control at the wide-angle end this is replaced to read "stop third lens group".

In step S410, movement of the third lens group stepping motor 1007 is stopped and the third lens group 1006 is stopped at the lens position at time T3 shown in FIG. 17.

In step S411, focusing control is ended.

In the fifth embodiment, high-speed gross focusing control is carried out using the third lens group 1006 and high-accuracy fine focusing control using the second lens group 1004, thus making it possible to achieve high-speed, high-accuracy focusing control in a compact design that does not require new and additional mechanical structures.

In addition, both the third lens group 1006 and the second lens group 1004 move in a single direction during focusing control, and thus there is no need to reverse the drive means drive direction. Moreover, since the second lens group 1004 is driven by promptly detecting the point of maximal focus by a maximal amount detection means, focusing speed can be increased without loss of time. In addition, the maximal value is calculated, making it possible to achieve high-accuracy focusing.

In addition, since the ratio of the speed of movement of the focal plane of the second lens group 1004 driven at the end of focusing control is smaller than that of the third lens group 1006 driven at the beginning of focusing control, high-accuracy focus can be achieved at the end of focusing control.

In addition, slowing the speed of movement of the focal plane at the end of focusing control makes it possible to measure the state of focus accurately, thus enabling focusing accuracy to be improved.

Moreover, by performing focusing control on the wide-angle side in which a fully accurate in-focus state can be attained without stopping the driving of the lens groups in the direction of the optical axis with high accuracy using only the third lens group 1006, focusing speed can be increased.

Sixth Embodiment

A description will now be given of focusing control in the telephoto end state in a sixth embodiment of the present invention, using FIGS. 21, 16 and 18.

In the sixth embodiment, the structure of the lens barrel and camera are the same as in the first embodiment, and thus a description thereof is omitted.

It is assumed that the lens groups are positioned at the telephoto end and focused on infinity, with the photographic subject to be sensed positioned 2 m away from the camera.

Figure 21:
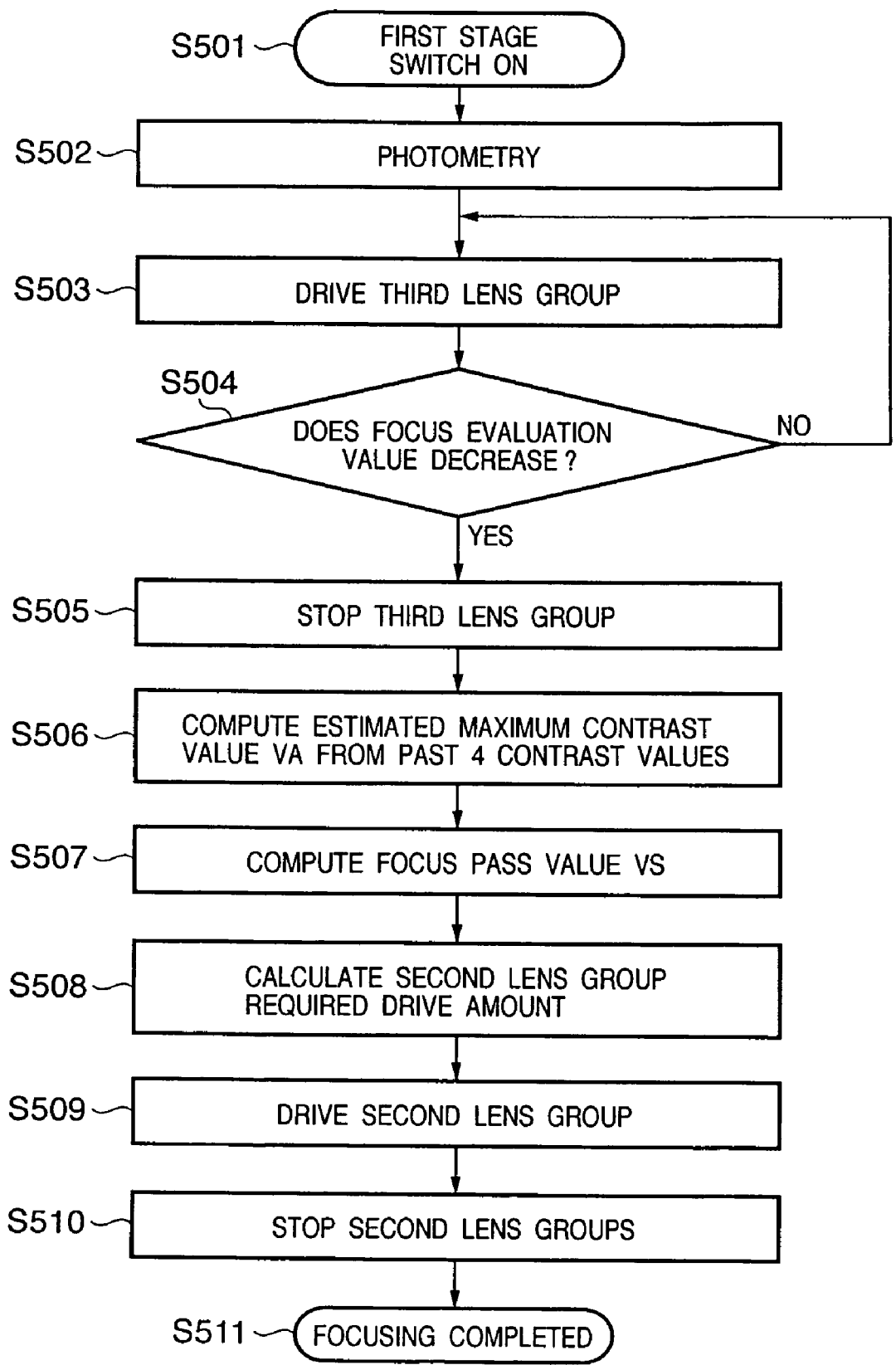
FIG. 21 is a flow chart illustrating focusing control according to a sixth embodiment of the present invention.

In the flow chart of focusing control shown in FIG. 21, the first stage switch is turned on when the release button 1011 is pressed lightly in step S501, and in step S502 photometry is performed based on the amount of light reaching the image sensor 1008.

In step S503, as shown in the left graph in FIG. 16, the third lens group 1006, which is a concave lens system, begins to move linearly toward the image sensor 1008. The focusing sensitivity at this time is −8.4. In FIG. 18, when the third lens group stepping motor 1007 is driven one step, the third lens group 1006 is driven 5 μm toward the image sensor 1008, the position of the focal plane changes from P0 to P1, and the focus evaluation value increases from V0 to V1.

In step S504, it is determined whether or not the focus evaluation value has decreased. In this case, the focus evaluation value has increased, and thus the process returns to step S503.

In step S503, when the third lens group 1006 is driven one step further toward the image sensor 1008, the position of the focal plane changes from P1 to P2. In step S504, since the focus evaluation value increases from V1 to V2, the determination result is NO and processing returns to step S503.

In step S503, when the third lens group 1006 is driven one step further toward the image sensor 1008, the position of the focal plane changes from P2 to P3. In step S504, since the focus evaluation value increases from V2 to V3, the determination result is NO and processing returns to step S503.

In step S503, when the third lens group 1006 is driven one step further still toward the image sensor 1008, the position of the focal plane changes from P3 to P4. In FIG. 16, the focus evaluation value reaches its maximal value (maximum focus evaluation value) VP at time T1, after which it begins to decline.

In step S504, since the focus evaluation value has decreased from V2 to V3, the determination result is YES and processing proceeds to step S505.

In step S505, the third lens group 1006 is stopped.

In step S506, the focus evaluation value estimated maximum value VA is obtained from a multidimensional formula that passes through the focus evaluation values (V1, V2, V3, V4) of the past four points (P1, P2, P3, P4).

In step S507, the focus pass value is calculated as VS=0.9× VA.

In step S508, how many steps the second lens group 1004 should be driven toward the image sensor 1008 is determined by computing the number of steps of the second lens group 1004 from the difference between the current focal plane position P4 and the position PA of the focus evaluation value estimated maximum value VA as well as from the amount of movement of the focal plane per step of the second lens group 1004.

In FIG. 18, it can be seen that the position PA of the focal plane at the focus evaluation value estimated maximum value VA lies between positions P2 and P3 of the focal plane through which the third lens group 1006 is capable of moving, and closer to P3. In addition, because the second lens group 1004 focusing sensitivity is 2.8, or one third that of the third lens group 1006, the focal plane also moves a third as much when the second lens group 1004 moves one step, making fine focusing control possible. From the estimate computation, it is clear that the second lens group 1004 needs to move four steps in order to get the focus evaluation value to approach the estimated maximum value VA and exceed the focus pass level value VS.

In step S509, when the second lens group 1004 is driven four steps, the position of the focal plane moves from P4 to P8 and the focus evaluation value exceeds the focus pass value VS.

In step S510, movement of the second lens group stepping motor 1005 is stopped and the second lens group 1004 is stopped at the lens position at time T3 shown in FIG. 16.

In step S511, focusing control is ended.

In the sixth embodiment, the focus evaluation value maximal value is calculated by, for example, a higher-order curved line formula from a plurality of, for example, four focus evaluation value points, thus making high-accuracy focus possible.

In addition, the amount of movement is calculated and the second lens group 1004 is moved that amount, making high-speed focus possible.

Seventh Embodiment

A description will now be given of a seventh embodiment of the present invention, using FIGS. 22, 23 and 24.

In the seventh embodiment, the structure of the camera is the same as that of the first embodiment, and therefore a description thereof is omitted.

Figure 22:
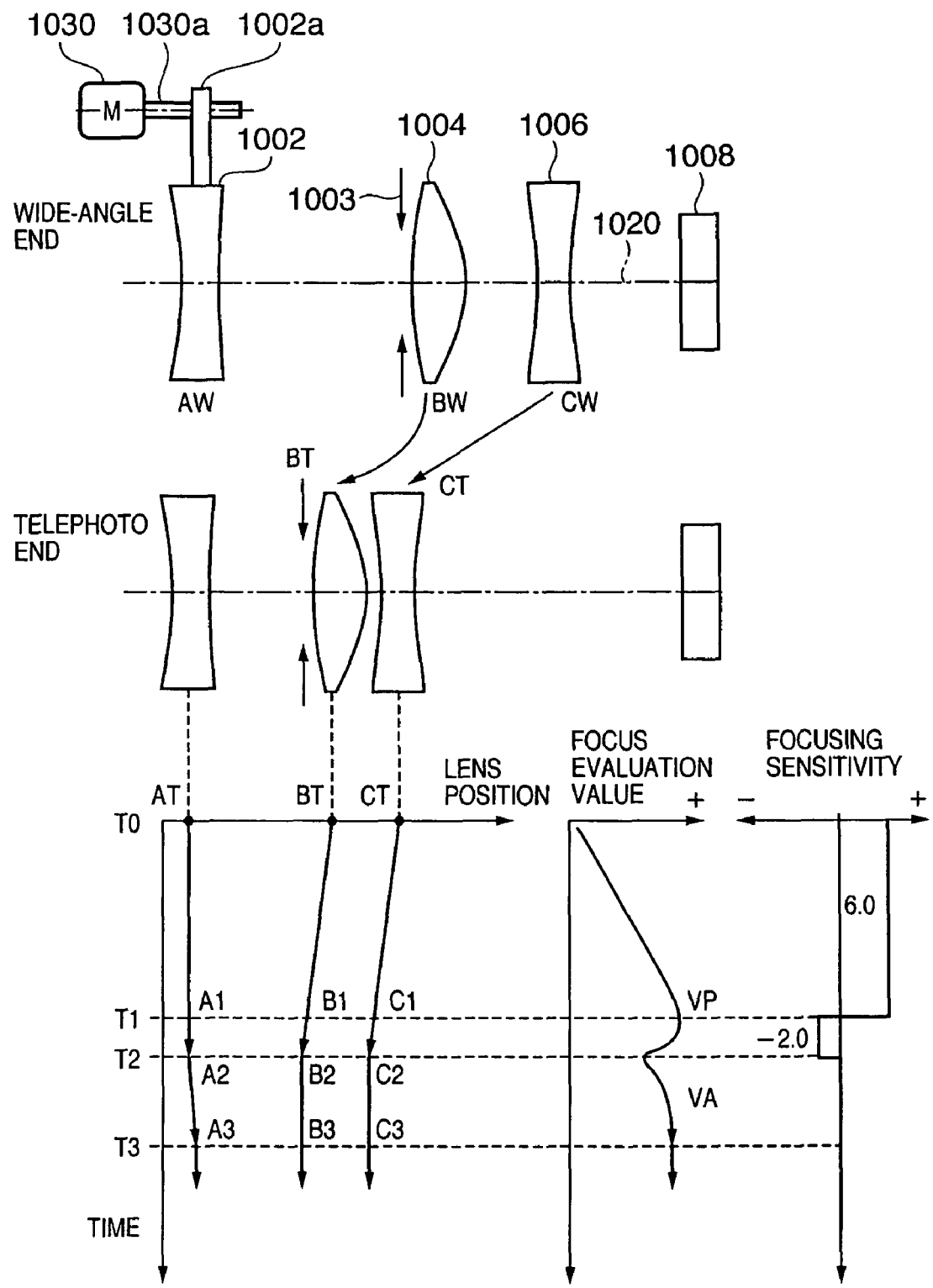
FIG. 22 is a schematic diagram showing the relative positions of zoom lens groups at the telephoto end and the wide-angle end and focusing control at the telephoto end according to a seventh embodiment of the present invention.

Although the lens barrel is virtually identical to that of the first embodiment, what is different is that the first lens group 1002 is also drivable in the direction of the optical axis, and as shown schematically in FIG. 22, the first lens group 1002 is supported by an ordinary support method (for example, by guide bar or cam barrel) so as to be capable of moving reciprocally in the direction of the optical axis inside the lens barrel. The tip of the rotary shaft of a stepping motor 1030 for the first lens group 1002 forms a lead screw 1030a, which engages a nut 1002a on the first lens group 1002, such that, when the stepping motor 1030 rotates forward/in reverse, the first lens group 1002 moves reciprocally in the direction of the optical axis. Control of that rotation is performed by the signal processing circuit 1010 inside the camera body 1009. The lead of the lead screw 1030a is 0.20 mm/lead. Forty control pulses cause the first lens group stepping motor 1030 to make one rotation. That is, when the first lens group stepping motor 1030 rotates one step, the first lens group 1002 moves 5 μm.

Figure 23:
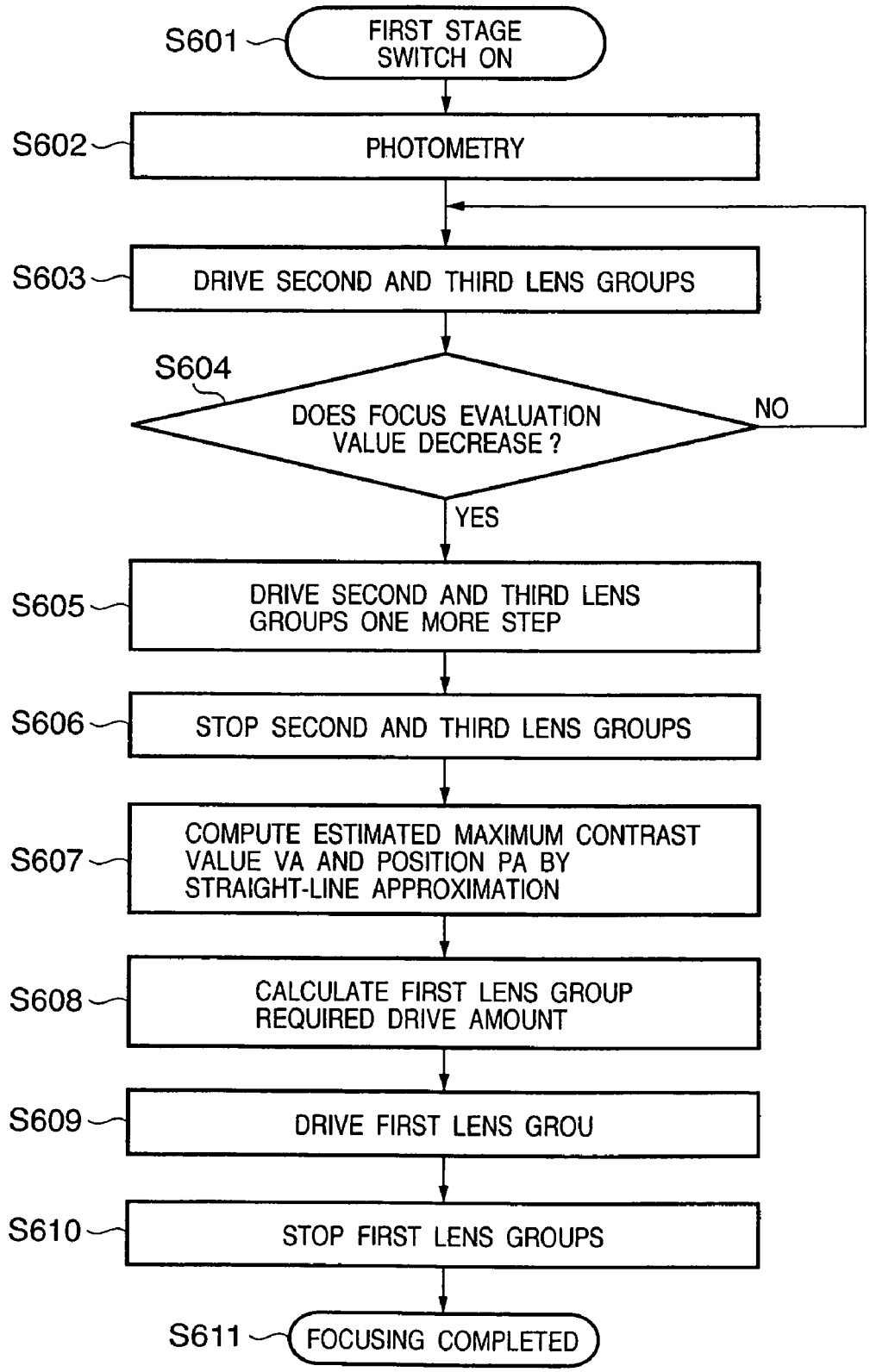
FIG. 23 is a flow chart illustrating focusing control according to the seventh embodiment of the present invention.
Figure 24:
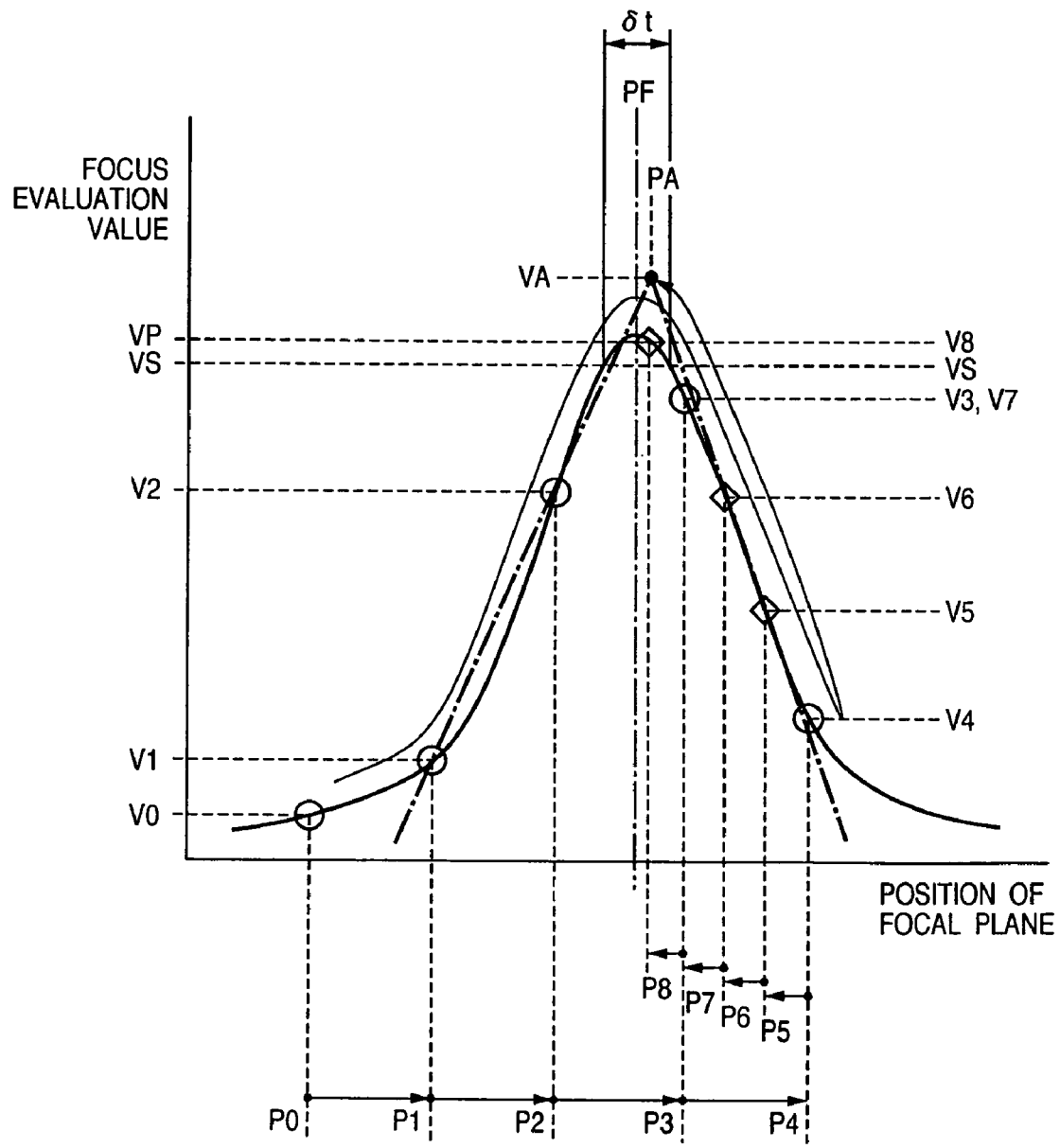
FIG. 24 is a diagram showing the relation between focal plane position and focus evaluation value at the telephoto end according to the seventh embodiment of the present invention.
Figure 25:
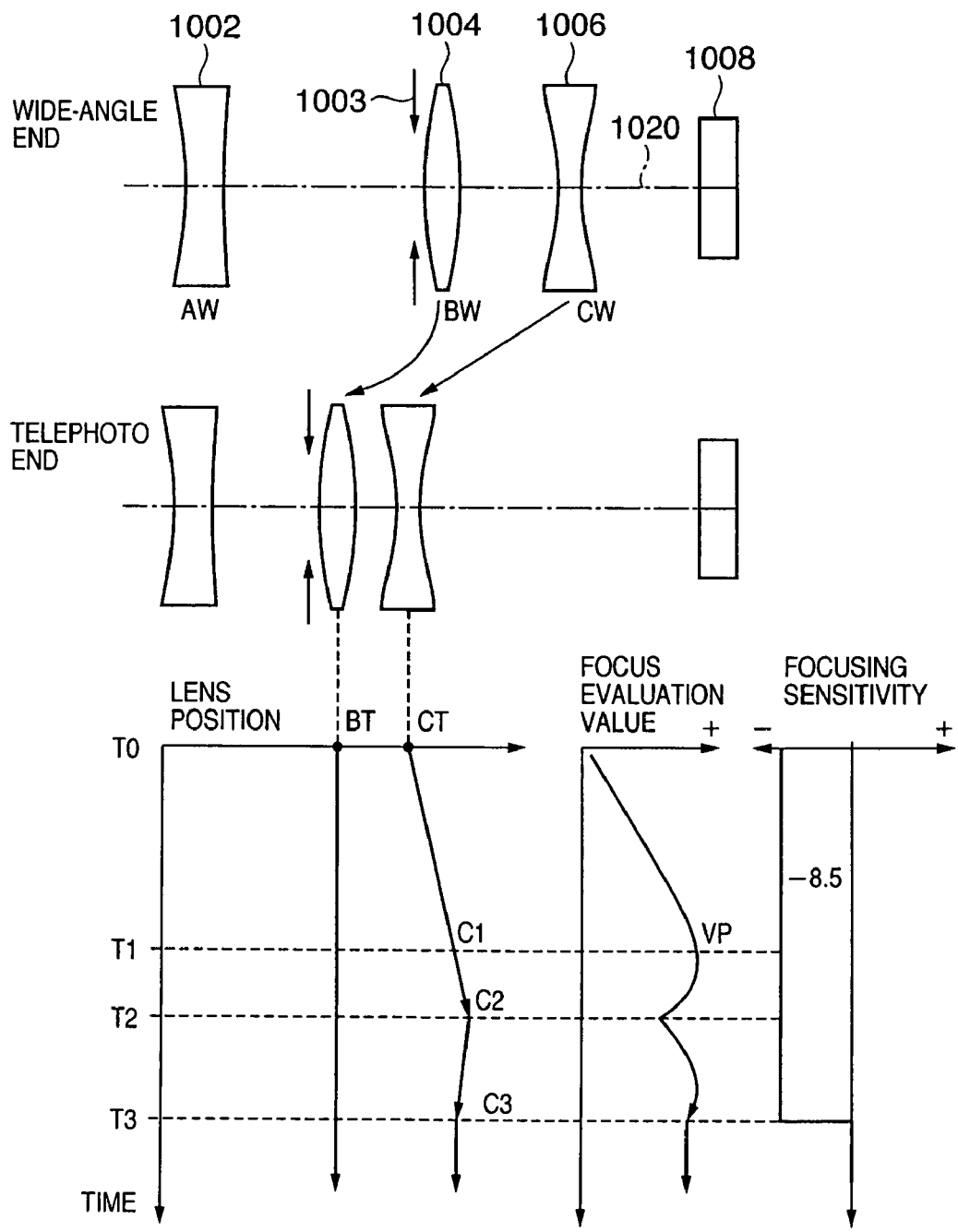
FIG. 25 is a schematic diagram showing the relative positions of zoom lens groups at the telephoto end and the wide-angle end and focusing control at the telephoto end according to a conventional example.
Figure 26:
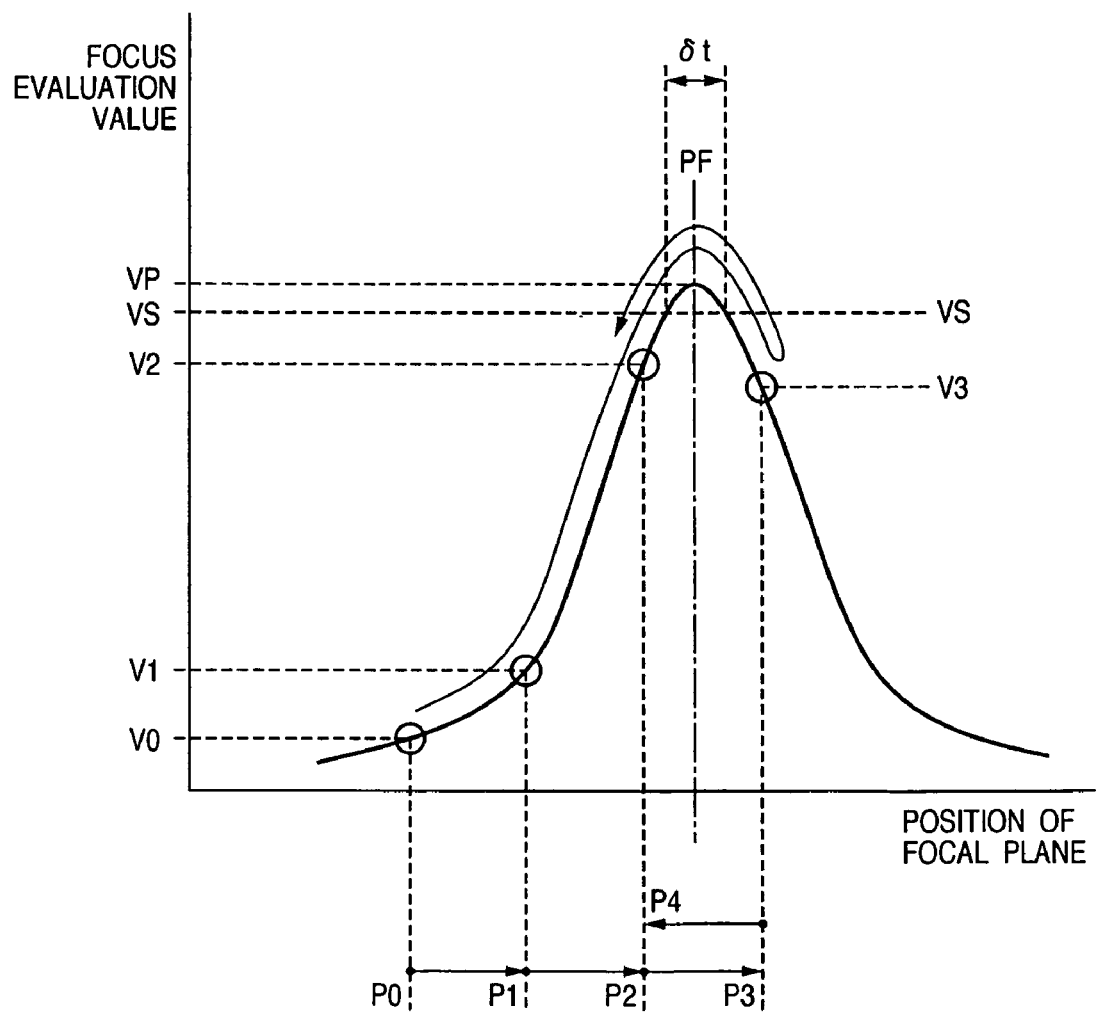
FIG. 26 is a diagram showing the relation between focal plane position and focus evaluation value at the telephoto end according to the conventional example.

In the flow chart of focusing control shown in FIG. 23, the first stage switch is switched on when the release button 1011 is pressed lightly in step S601, and in step S602 photometry is performed based on the amount of light reaching the image sensor 1008.

In step S603, as shown in the left graph in FIG. 22, the second lens group 1004, which is a convex lens system, and the third lens group 1006, which is a concave lens system, begins to move linearly toward the photographic subject. The focusing sensitivity at this time is 6.0. In FIG. 24, when the second lens group stepping motor 1005 and the third lens group stepping motor 1007 are driven one step, the position of the focal plane changes from P0 to P1 and the focus evaluation value increases from V0 to V1.

In step S604, it is determined whether or not the focus evaluation value has decreased. In this case, the focus evaluation value has increased, and thus the process returns to step S603.

In step S603, when the second lens group 1004 and the third lens group 1006 are driven one step, the position of the focal plane changes from P1 to P2. In step S604, since the focus evaluation value increases from V1 to V2, the determination result is NO and processing returns to step S603.

In step S603, when the second lens group 1004 and the third lens group 1006 are driven one step further, the position of the focal plane changes from P2 to P3. In step S604, since the focus evaluation value has increased from V2 to V3, the determination result is NO and processing returns to step S603.

In step S603, when the second lens group 1004 and the third lens group 1006 are driven one step further still toward the photographic subject, the position of the focal plane changes from P3 to P4. In FIG. 16, the focus evaluation value reaches its maximal value (maximum focus evaluation value) VP at time T1, after which it begins to decline.

In step S604, since the focus evaluation value has decreased from V3 to V4, the determination result is YES and processing proceeds to step S605.

In step S605, the second lens group 1004 and the third lens group 1006 are driven one step more.

In step S606, the second lens group 1004 and the third lens group 1006 are stopped.

In step S607, the estimated maximum focus evaluation value VA and the focal plane position PA are computed by straight-line approximation. This utilizes the focus evaluation values (V1, V2, V3, V4) of the past four measured focal plane positions (P1, P2, P3, P4) and takes the intersection of a first line passing through focus evaluation values V1 and V2 and a second line passing through focus evaluation values V3 and V4 on the graph as the focus evaluation value estimated maximum value VA and the focal plane estimated position PA therefor.

In step S608, when the first lens group 1002 is focusing, the number of drive steps is calculated taking into account the distance to be driven from the current focal plane position P4 to the focal plane estimated position PA at which the focus evaluation value is at its maximum as well as the focusing sensitivity.

In step S609, the first lens group 1002 is driven the number of steps obtained in step S608.

In step S610, the first lens group 1002 is stopped.

In step S611, the focusing control is ended.

In the seventh embodiment, the focus evaluation value maximum value is calculated from the intersection of two straight lines, enabling high-speed calculation and high-speed focus.

In addition, since the range of movement through which the first lens group 1002 moves at the end of focusing is small, the structure of the first lens group stepping motor 1030 can be made simpler than the second lens group stepping motor 1005 and the third lens group stepping motor 1007.

The focusing control at the telephoto end described above is not limited to the telephoto end, and may be carried out over the entire range from the telephoto end to the wide-angle.

As many apparently widely different embodiments of the present invention can be made without departing from the spirit and scope thereof, it is to be understood that the invention is not limited to specific embodiments thereof except as defined in the appended claims.

This application claims the benefit of Japanese Patent Application No. 2005-068711 filed on Mar. 11, 2005, which is hereby incorporated by reference herein in its entirety.

What is claimed is:

1. A zoom lens control apparatus that, when zooming, moves a first lens for zooming and a second lens for focusing positioned behind the first lens on the optical axis of the first lens with respect to a photographic subject in an optical axis direction, the apparatus comprising:

an image sensing unit that converts an optical image of the photographic subject entering through the first lens and the second lens into image data;

a calculation unit that calculates a focus evaluation value that indicates a state of focus based on the image data from the image sensing unit, the focus evaluation value reaching a peak at a position where the state of focus is an in-focus state; and a focusing controller that carries out focusing control based on the peak by moving the second lens so that a focal plane moves at a first speed until the focus evaluation value calculated by the calculation unit reaches the peak, and carries out focusing control by moving the first lens and the second lens so that the focal plane moves at a second speed which is slower than the first speed after the focus evaluation value calculated by the calculation unit has passed the peak.

2. The zoom lens control apparatus according to claim 1, wherein the focusing controller moves the second lens in a preset optical axis direction before the focus evaluation value calculated by the calculation unit has passed the peak, and moves the first lens and the second lens in the preset optical axis direction after the focus evaluation value calculated by the calculation unit has passed the peak.

3. The zoom lens control apparatus according to claim 1, wherein a ratio of the speed of movement of the first lens and the second lens is held constant after the focus evaluation value calculated by the calculation unit has passed the peak.

4. The zoom lens control apparatus according to claim 1, wherein the focusing controller moves the second lens in a preset optical axis direction before the focus evaluation value calculated by the calculation unit has passed the peak, and moves the first lens and the second lens in the direction opposite to the preset optical axis direction after the focus evaluation value calculated by the calculation unit has passed the peak.

5. An optical instrument comprising:

the zoom lens control apparatus according to claim 1, wherein the first lens moves in the optical axis direction when zooming, and wherein the second lens positioned behind the first lens on the optical axis of the first lens with respect to a photographic subject moves in the optical axis direction when zooming.

6. A zoom lens control method of, when zooming, moving a first lens for zooming and a second lens for focusing positioned behind the first lens on the optical axis of the first lens with respect to a photographic subject in an optical axis direction, the method comprising:

a calculation step of calculating a focus evaluation value that indicates a state of focus based on image data from an image sensing unit, the focus evaluation value reaching a peak at a position where the state of focus is an in-focus state; and a focusing control step of carrying out focusing control based on the peak by moving the second lens so that a focal plane moves at a first speed until the focus evaluation value calculated by the calculation unit reaches the peak, and carries out focusing control by moving the first lens and the second lens so that the focal plane moves at a second speed which is slower than the first speed after the focus evaluation value calculated by the calculation unit has passed the peak.

* * * * *